United States Patent [19]
Koizumi et al.

[11] Patent Number: 5,486,927
[45] Date of Patent: Jan. 23, 1996

[54] DIGITAL IMAGE FORMING APPARATUS USING SUBDIVIDED PIXELS

[75] Inventors: Noboru Koizumi; Satoshi Haneda; Yoshiyuki Ichihara; Takashi Hasebe; Tetsuya Niitsuma, all of Tokyo, Japan

[73] Assignee: Konica Corporation, Tokyo, Japan

[21] Appl. No.: 927,746

[22] Filed: Aug. 10, 1992

[30] Foreign Application Priority Data

| Aug. 19, 1991 | [JP] | Japan | 3-206883 |
| Aug. 26, 1991 | [JP] | Japan | 3-213678 |
| Sep. 10, 1991 | [JP] | Japan | 3-230485 |
| Oct. 15, 1991 | [JP] | Japan | 3-266519 |

[51] Int. Cl.$^6$ .......................... H04N 1/387; H04N 1/29; H04N 1/40; G01D 15/14
[52] U.S. Cl. .......................... 358/298; 358/300; 358/456; 347/131
[58] Field of Search .......................... 358/298, 300, 358/443, 456, 457, 535; 382/41, 54, 254, 276; 346/1.1, 108, 160; 347/129, 131–133, 224, 225, 232, 233

[56] References Cited

U.S. PATENT DOCUMENTS

| 4,124,870 | 11/1978 | Schatz et al. | 358/260 |
| 4,150,400 | 4/1979 | Wong | 358/260 |
| 4,258,393 | 3/1981 | Ejir et al. | 358/283 |
| 4,782,398 | 11/1988 | Mita | 358/298 X |
| 4,868,684 | 9/1989 | Suzuki | 358/456 X |
| 5,050,000 | 9/1991 | Ng | 358/298 |
| 5,172,132 | 12/1992 | Haneda et al. | 346/1.1 |

FOREIGN PATENT DOCUMENTS

| 2386213 | 10/1978 | France | H04N 1/40 |
| 5-107698 | 4/1993 | Japan | G03C 5/29 |
| 5-127341 | 5/1993 | Japan | G03D 3/06 |
| 5-119454 | 5/1993 | Japan | G03D 3/06 |
| 5-113646 | 5/1993 | Japan | G03C 7/407 |

*Primary Examiner*—Peter S. Wong
*Assistant Examiner*—Eric Frahm
*Attorney, Agent, or Firm*—Frishauf, Holtz, Goodman, Langer & Chick

[57] ABSTRACT

In a method of forming an image in a form of pixels, the density distribution around a target pixel is obtained by processing image signals of pixels neighboring the target pixel. The target pixel is sub-divided into a plurality of sub-pixels which form of matrix of n rows×m columns. The sub density distribution of the sub-pixels in the target pixel is assumed from the density distribution of the neighboring pixels. The density of each of sub-pixels is determined by multiplying the density of the target pixel, by a constant P and a density ratio of the corresponding sub-pixels in the sub density distribution.

11 Claims, 28 Drawing Sheets

| m1 = 226 | m2 = 251 | m3 = 8 |
| --- | --- | --- |
| m4 = 200 | m5 = 45 | m6 = 7 |
| m7 = 190 | m8 = 8 | m9 = 2 |

| S1 = 71 | S2 = 77 | S3 = 24 |
| --- | --- | --- |
| S4 = 66 | S5 = 32 | S6 = 24 |
| S7 = 64 | S8 = 24 | S9 = 23 |

⁄⁄ : AREA CONCERNING S1
≡ : AREA CONCERNING S2
||| : AREA CONCERNING S3
\\ : AREA CONCERNING S4

⁄⁄ : AREA CONCERNING S1
≡ : AREA CONCERNING S2
||| : AREA CONCERNING S3
\\ : AREA CONCERNING S4

FIG. 13(a)

| m1 | m2 | m3 | m4 |
|---|---|---|---|
| m5 | m6 | m7 | m8 |
| m9 | m10 | m11 | m12 |

FIG. 13(b)

| S1 | S2 | S3 | S4 |
|---|---|---|---|
| S5 | S6 | S7 | S8 |
| S9 | S10 | S11 | S12 |

FIG. 14(a)

| m1 = 220 | m2 = 220 | m3 = 187 | m4 = 150 |
|---|---|---|---|
| m5 = 190 | m6 = 180 | m7 = 170 | m8 = 120 |
| m9 = 132 | m10 = 111 | m11 = 96 | m12 = 52 |

FIG. 14(b)

| | ↙ m6 | ↙ m7 | |
|---|---|---|---|
| $S_1$ = 215 | $S_2$ = 204 | $S_3$ = 196 | $S_4$ = 175 |
| $S_5$ = 198 | $S_6$ = 192 | $S_7$ = 186 | $S_8$ = 157 |
| $S_9$ = 164 | $S_{10}$ = 152 | $S_{11}$ = 143 | $S_{12}$ = 118 |

FIG. 15(a)

| m1 | m2 | m3 | m4 |
|----|----|----|----|
| m5 | m6 | m7 | m8 |
| m9 | m10 | m11 | m12 |

FIG. 15(b)

| S1 (m6) | S2 | S3 | S4 (m7) |
|----|----|----|----|
| S5 | S6 | S7 | S8 |

FIG. 21
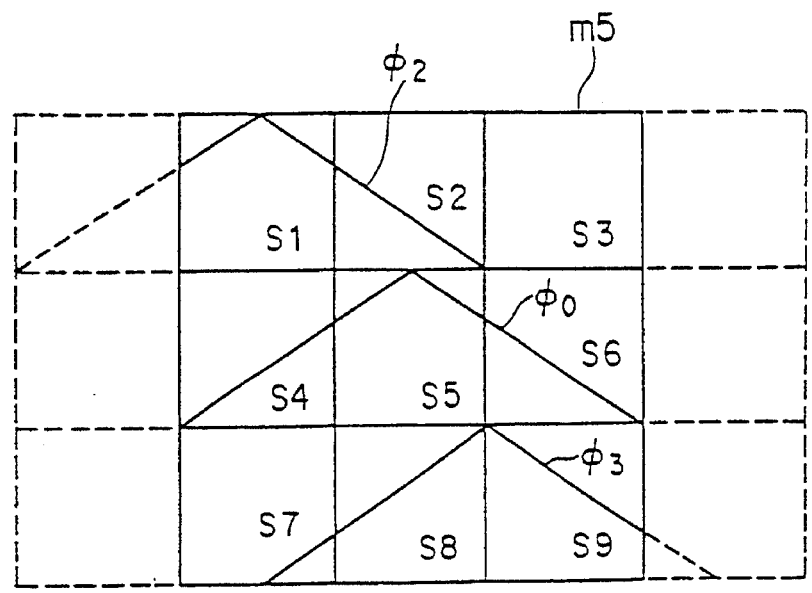
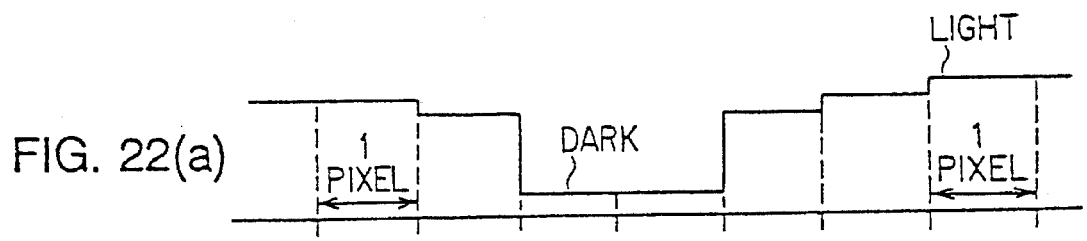
FIG. 22(a)
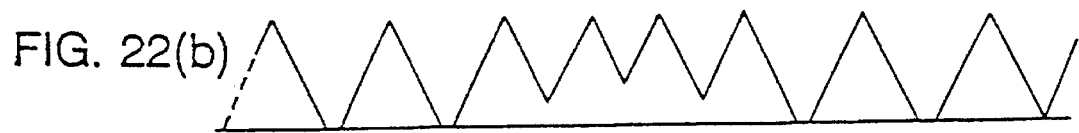
FIG. 22(b)
FIG. 22(c)
FIG. 22(d)

FIG. 26(a) Reference Clock

FIG. 26(b) Reference Triangular Wave
(In Case of n=3)

FIG. 26(c) M/(n+1)×3 SEC-DELAYED TRIANGULAR WAVE

FIG. 26(d) M/(n+1)×1 SEC-DELAYED TRIANGULAR WAVE

FIG. 29(a) Reference Clock

FIG. 29(b) Reference Triangular Wave (In Case of n=2)

FIG. 29(c) M/(n+2)×3 SEC-DELAYED TRIANGULAR WAVE

FIG. 29(d) M/(n+2)×1 SEC-DELAYED TRIANGULAR WAVE

DIGITAL IMAGE FORMING APPARATUS USING SUBDIVIDED PIXELS

BACKGROUND OF THE INVENTION

The present invention relates to an image forming method wherein image data corresponding to one selected pixel portion or to u×v (horizontal×vertical) pixels portion are formed with small dots in a quantity equal to n×m (horizontal×vertical) dots, and these small dots are modulated by reference wave signals or the like to be modulated signals which are dot-recorded or dot-displayed for reproducing line images and half tone images.

In the field of an image forming apparatus based on an electrophotography, an image on an original is read as image signals by a scanner, and the image signals are subjected to gradation correction, A/D conversion and shading correction to be image density data. The image density data are modulated by reference wave signals so that digital images having therein reproduced half tone images may be obtained.

With regard to image signals obtained by reading an image on a original by a scanner, an edge portion of the image is read as a half tone image density due to an aperture of a solid image sensor incorporated in the scanner. When image density data obtained from the image signals is used to produce a latent image on a photoreceptor, recording pixels corresponding to edges of the latent image are recorded on an average within recording pixels when density is medium. Therefore, sharpness of the image is deteriorated for recording. To correct this problem, MTF correction methods can be used wherein a differential filter or a Laplacian filter is used for image signals for sharpening images. In these methods, however, only edge portions of an image are sharpened and uniformity of halftone images is relatively deteriorated.

Even when interpolation characters or graphics are formed by CG or font data, on the other hand, the same problem still happens. Namely, when interpolation data interpolate edge portions smoothly by means of medium density, recording pixels corresponding to the edge portions are recorded in pixels as the average density. Therefore, the sharpness of recorded images is deteriorated.

For the above reason, medium density processing that works effectively on the edge portions of an image is required.

SUMMARY OF THE INVENTION

With the problems mentioned above taken into cosideration, an object of the invention is to provide an image forming method wherein a sharpness of an image formed by means of a scanner, CG or font data may be enhanced and images are formed by means of a printer or CRT output.

The object of the invention mentioned above is achieved by an image forming method for forming density data of one or more selected pixels in a matrix formed by u×v (horizontal×vertical) pixels. One or more selected pixels are divided into sub-pixels which form a small matrix having n×m (horizontal×vertical) pixels. Wherein distribution of density data of the pixels adjoining the selected pixel is replaced with a density distribution of small pixels within the selected pixel, and density data of the selected pixel is multiplied by the constant p and is allocated to the distribution mentioned above as the density of the aforementioned small pixels.

A preferable embodiment of the invention may be represented by an image forming method wherein the value of the aforementioned constant p ranges from a value of 0.1 to 0.9 and preferably from 0.4 to 0.5 and is variable depending on conditions such as external designation, images or an output device.

The object mentioned above can be achieved by an image forming apparatus capable of recording pixels in high density by means of density data corresponding to pixels wherein density distribution of one or more selected pixels and other pixels adjoining the one or more selected pixels determines a record density distribution in the one or more selected pixels and recording in which a phase of a reference wave is selected based on the determined density distribution mentioned above.

In the preferable embodiment of the invention, the aforementioned pixel has therein a plurality of recording positions and density information are modulated by the selected reference wave.

The object mentioned above can be achieved by an image forming apparatus capable of recording pixels in high density by scanning with a laser beam obtained by dividing one pixel into the number of n×m and modulating a plurality of pulse widths wherein a phase of the reference wave used for modulating the aforementioned pulse width is delayed by $M/(n+1)$ seconds for the aforementioned value n when n is an odd number and delayed by of $M/(n+2)$ seconds for the value n when n is an even number, both when a clock time of a pixel clock is represented by M.

BRIEF DESCRIPTION OF THE DRAWINGS

FIGS. 13(a) and 13(b) are diagrams for explaining an image forming method of the invention;

FIGS. 14(a) and 14(b) are diagrams showing an example of the invention wherein two pixels of a selected pixel are divided into a 4×3 matrix with p=0.5;

FIGS. 15(a) and 15(b) are diagrams showing an example wherein two pixels of a selected pixel of the invention are divided into the number of 4×2;

FIG. 21 is a diagram for explaining RE processing used for determining a phase of a reference wave;

FIGS. 22(a), 22(b), 22(c) and 22(d) are time charts showing signals of each portion in a modulation signal generating circuit in the example in FIG. 18.

DETAILED DESCRIPTION OF THE PREFERRED EMBODIMENT

Figure 10:
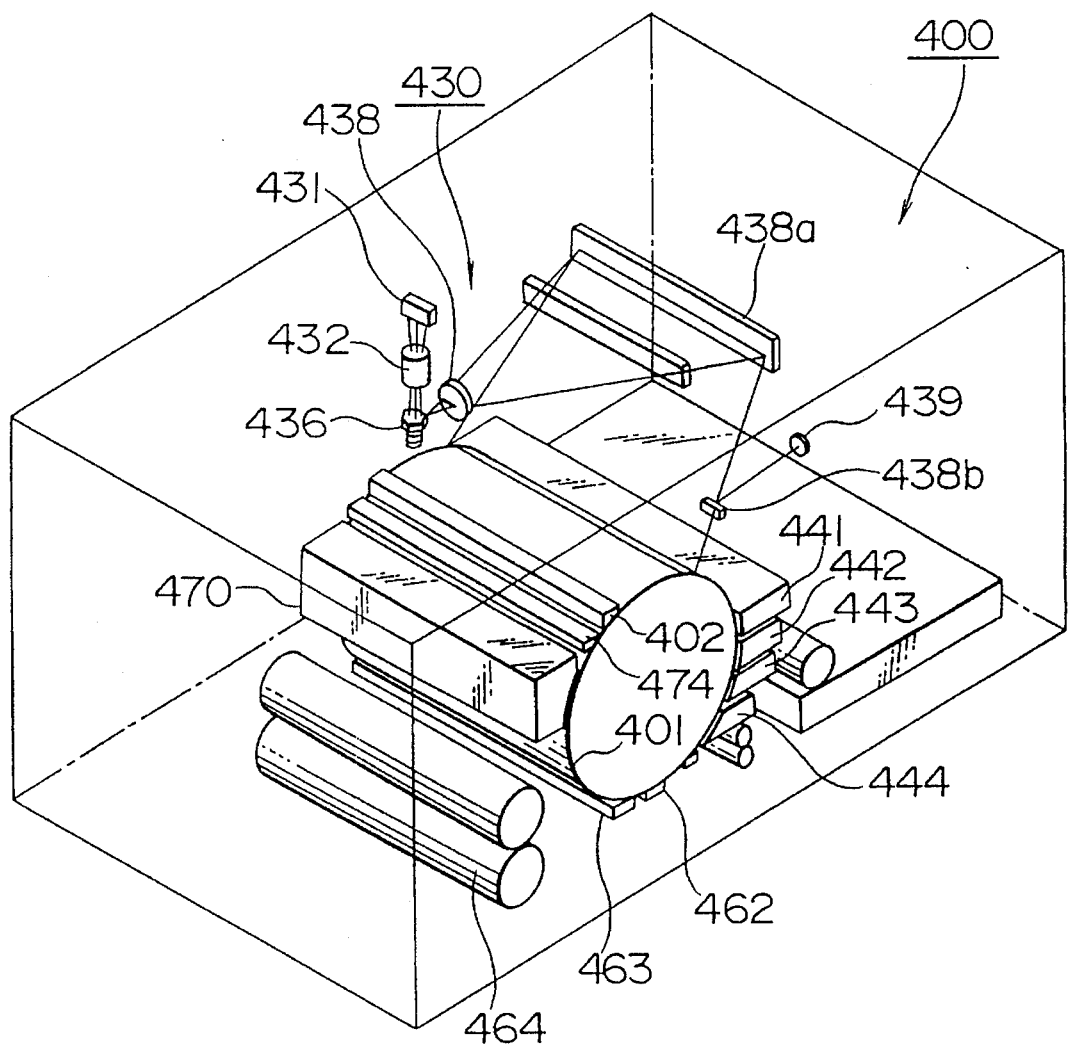
FIG. 10 is a perspective view showing rough structure of an image forming apparatus in one example wherein the invention is applied.

The constitution of image forming apparatus 400 that is an example to which the invention is applied will be explained as follows. FIG. 10 is a perspective view showing the schematic structure of an image forming apparatus of the present example.

In color image forming apparatus 400, a photoreceptor is charged uniformly and then digital image data from a computer or from a scanner are subjected to D/A conversion to obtain analog image density signals, and then the analog image density signals thus obtained are subjected to binary coding or differential amplification after being compared with reference signals so that modulated signals may be obtained. Based on the modulated signals, pulse width modulation or intensity modulation is conducted to obtain a spotlight which is used for forming a dot-composed static latent image on the photoreceptor. The static latent image is subjected to reversal development employing toners to be a dot-composed toner image. The steps of charging, exposure and development mentioned above are repeated to form a color toner image on photoreceptor 401, and the color toner image is transferred, separated and fixed to obtain a color image.

Image forming apparatus 400 comprises a drum-shaped photoreceptor rotating in the arrowed direction (hereinafter referred to simply as a photoreceptor) 401, scorotron charger 402 that gives charges uniformly on the photoreceptor 401, scanning optical system 430, developing units 441–444 containing respectively yellow toners, magenta toners, cyan toners and black toners, scorotron transferring unit 462, separating unit 463, fixing roller 464, cleaning unit 470 and charge eliminating unit 474.

Figure 9:
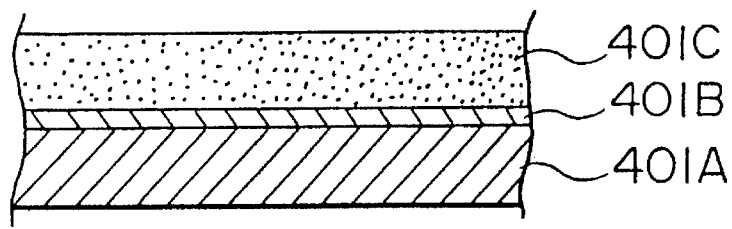
FIG. 9 is a sectional view showing an actual example of a structure of the high-γ photoreceptor used in the present example.

The photoreceptor 401 used in the present example has a specific characteristic of high γ, and an example of its concrete structure is shown in FIG. 9.

The photoreceptor 401 is composed of electrically conductive support 401A, interlayer 401B and light-sensitive layer 401C. The thickness of the light-sensitive layer 401C is about 5–100 μm and preferably is 10–50 μm. The photoreceptor 401 consists of conductive support 401A that is made of aluminum and has a diameter of 150 mm on which the interlayer 401B that is made of ethylene-vinyl acetate copolymer and is 0.1 μm in thickness is formed and 35 μm thick light-sensitive layer 401C is provided on the interlayer 401B.

As the conductive support 401A, a drum made of aluminum, steel or copper and having a diameter of about 150 mm is used. In addition, a belt-shaped one wherein a metal layer is laminated or evaporated on a sheet of paper or a plastic film, or a metallic belt such as a nickel belt made through a electroforming method may be used. Further, from the viewpoint that the photoreceptor can stand the high voltage charging of ±500–±2000 V, pouring of electrons from electrically conductive support 1C can be prevented in the case of positive charging, and excellent light decay characteristics due to an avalanche phenomenon may be obtained, it is preferable that the interlayer 401B has a Hall mobility. For that reason, it is preferable that charge-transfer materials of a positive charging type described in Japanese Patent Application No. 188975/1986 suggested previously by the inventor of the present invention are added in an amount of 10% by weight or less.

As the intermediate layer 401B, the following resins are used for a light-sensitive layer for electrophotographic use, for example, are employed in general.

(1) Vinyl type polymer such as polyvinyl alcohol (Poval), polyvinyl methylether and polyvinyl ethylether (2) Nitrogen-containing vinylpolymer such as polyvinylamine, poly-N-vinylimidazole, polyvinylpyridine (quaternary salt), polyvinylpyrrolidone, and vinylpyrrolidone-vinylacetatecopolymer (3) Polyether type polymer such as polyethyleneoxide, polyethyleneglycol and polypropyleneglycol
(4) Acrilic acid type polymer such as polyacrilic acid and its salt, polyacrylamide and poly-β-hydroxyethylacrylate
(5) Metaacrylic acid type polymer such as polymetaacrylic acid and its salt, polymetaacrylamide and polyhydroxypropylmetaacrylate
(6) Ether cellulose type polymer such as methylcellulose, ethylcellulose, carboxymethylcellulose, hydroxyethylcellulose and hydroxypropylmethylcellulose
(7) Polyethyleneimine type polymer such as polyethyleneimine
(8) Polyamino acid such as polyalanine, polyserine, poly-L-glutamic acid, poly-(hydroxyethyl)-L-glutamine, poly-δ -carboxymethyl-L-cystein, polyproline, lysine-tyrosinecopolymer, glutamic acid-lysine-alaninecopolymer, silk fibroin and casein
(9) Starch and its derivatives such as starchacetate, hydroxinethylstarch, starchacetate, hydroxyethylstarch, aminestarch and phosphatestarch, and
(10) Polymer soluble in mixed solvent of water and alcohol such as soluble nylon that is polyamide and methoxymethylnylon (8 type nylon)

Light-sensitive layer 401C is formed in a manner wherein phthalocyanine fine-grains each having a grain size of 0.1–1 μm and being made of photoconductive pigment including basically no charge-transfer material, antioxidants and binder resins are mixed and dispersed in a binder resin solvent to prepare a coating solution and the coating solution is coated on an interlayer, dried, and heat-treated if necessary.

When photoconductive materials and charge-transfer materials are used in combination, photoconductive materials comprising photoconductive pigments and a small amount of charge-transfer materials in an amount of not more than 1/5 or preferably of 1/1000–1/10 by weight of the photoconductive pigments and antioxidants are dispersed in binder resins to make a light-sensitive layer. When a photoreceptor with such a high γ is used, it is possible to form a sharp latent image despite an enlarged beam diameter, resulting in effective recording with a high resolving power.

Since color toner images are superposed on photoreceptor 401 in the present example, a photoreceptor having its spectral sensitivity on the infrared side and an infrared semiconductor laser are used so that a beam from a scanning optical system may not be shielded by the color toner images.

Light decay characteristics of a photoreceptor with a high γ used in the present example will be explained next.

Figure 8:
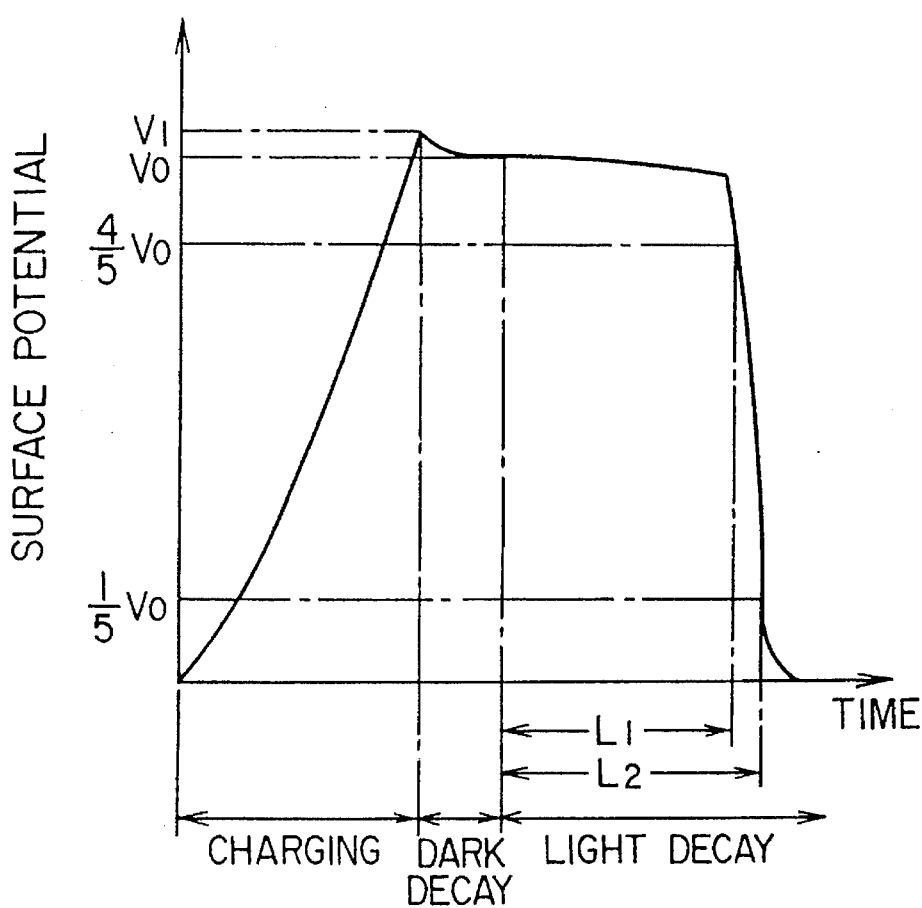
FIG. 8 is a graph showing specific characteristics of high-γ photoreceptor used in the present example.

FIG. 8 is a graph showing characteristics of a photoreceptor with a high γ. In the figure, $V_1$ represents a charging voltage (V), $V_0$ represents an initial voltage (V) before exposure, $L_1$ represents an amount of irradiated light (μJ/cm$^2$) of a laser beam necessary for the initial voltage $V_0$ to decay to 4/5 thereof and $L_2$ is an amount of irradiated light (μJ/cm$^2$) of the laser beam necessary to decay to 1/5.

The preferable range of $L_2/L_1$ is as follows.

$$1.0 < L_2/L_1 \leq 1.5$$

The following is for the present example.
$V_1=1000$ (V), $V_0=950$ (V), $L_2/L_1=1.2$
Further, photoreceptor voltage at an exposure portion is 10 V.

When photosensitivity at a position corresponding to the middle point of exposure where the initial voltage ($V_0$) decays to 1/2 thereof on the light decay curve is represented by E1/2, and photosensitivity at a position corresponding to the initial stage of exposure where the initial voltage ($V_0$) decays to 9/10 thereof is represented by E9/10, a photoconductive semiconductor satisfying the following relations is selected.

$$(E½)/(E9/10) \geq 2$$

or $$(E½)/(E9/10) \geq 5$$

Incidentally, the photosensitivity in this case is defined as an absolute value of an amount of drop of voltage for a small amount of exposure.

On the light decay curve of the photoreceptor 401, an absolute value of a differetial coefficient of a voltage characteristic which means photosensitivity is small when an amount of light is small as shown in FIG. 8, and it increases sharply as an amount of light increases. Actually, the light decay curve is almost flat in the initial stage of exposure due to the poor photosensitivity for a certain period as shown in FIG. 8. However, in the middle stage and thereafter to the latter stage, the light decay curve suddenly falls almost linearly due to the ultra-high sensitivity, which represents ultra-high γ characteristics. It is assumed that the photoreceptor 401 practically gains high γ characteristics utilizing an avalanche phenomenom under the high voltage charging at +500–+2000 V. Namely, carriers generated on the surface of photoconductive pigment in the initial stage of exposure are trapped effectively in the surface phase between the pigment and coating resin to inhibit light decay completely which results in a sharp avalanche phenomenon in the middle stage and thereafter.

An image forming method of the invention will be explained as follows. In the image forming method, one selected pixel portion of image density data is composed of small pixels forming an n×m (horizontal×vertical) matrix and the density data distribution of the adjoining pixels including the selected pixel is converted to the distribution of the small pixels formed by of n×m sub-pixels in the aforementioned selected pixel, and the image density data of the small pixels is obtained by distributing the data of the selected pixel multiplied by the constant P according to the aforesaid distribution are used for forming an image. This image density data processing is assumed to be resolving power enhancement processing (RE processing). The RE-processed image density data and pulse width-modulated image signals obtained by combining certain reference waves are used for forming an image. A photoreceptor with a high γ is especially effective for forming a latent image responding correctly to the reference wave.

Figures 1A, 1B:
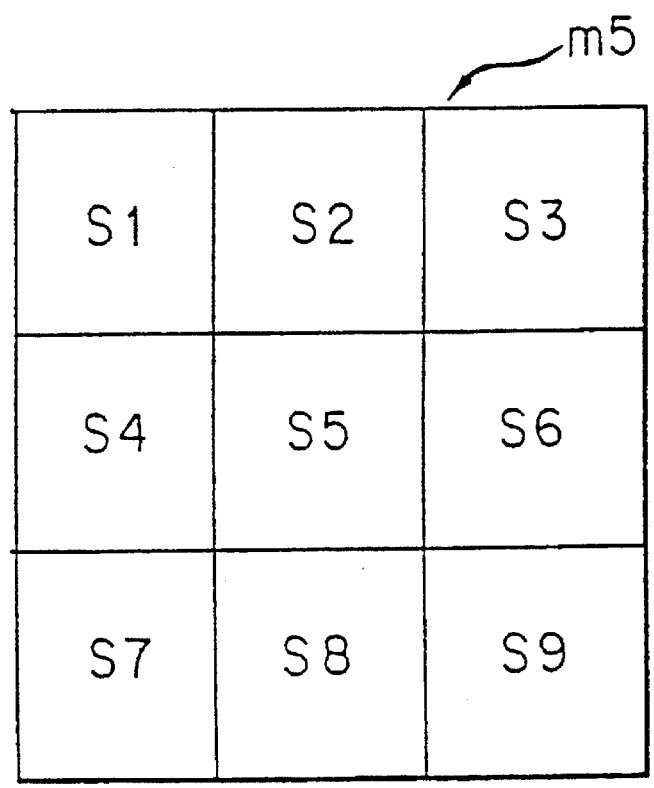
FIGS. 1(a) and 1(b) are diagrams for explaining an image forming method of the invention.

FIG. 1(a) shows a plan view wherein the aforesaid selected pixel is represented by m5, and adjoining pixels including the selected pixel m5 in the case of dividing the selected pixel m5 into a (3×3) matrix represented by n1–n9. FIG. 1(b) is an enlarged view showing that small parts in the case of dividing the selected pixel m5 nine small pixels forming a (3×3) matrix as are represented by s1–s9. It is to be noted that each of m1–m9 and s1–s9 also represents its density.

In the example of dividing the aforesaid looked pixel m5 into a small pixels a (3×3) matrix in the detailed explanation of the RE processing, a density of the small pixel si is determined by the following expression.

$$si = (9 \times m5 \times P \times mi/A) + (1-P) \times m5$$

In the above expression, $i=1, 2 \ldots 9$, and P is a constant that is intensity of RE processing in a way whose preferable value is within a range of 0.1–0.9. Incidentally, an effect to a certain extent can be expected even when P takes 1 (P=1) for easy processing. A represents the sum total of m1–m9.

In the above expression, a term of (9×m5×mi/A) means that density of a selected pixel m5 multiplied by P is allocated corresponding to the rate of density of adjoining pixels and a term of (1−P)×m5 means that remaining density of the selected pixel m5 is allocated uniformly to small pixels, which means that a factor of blur is taken in.

Figures 2A, 2B:
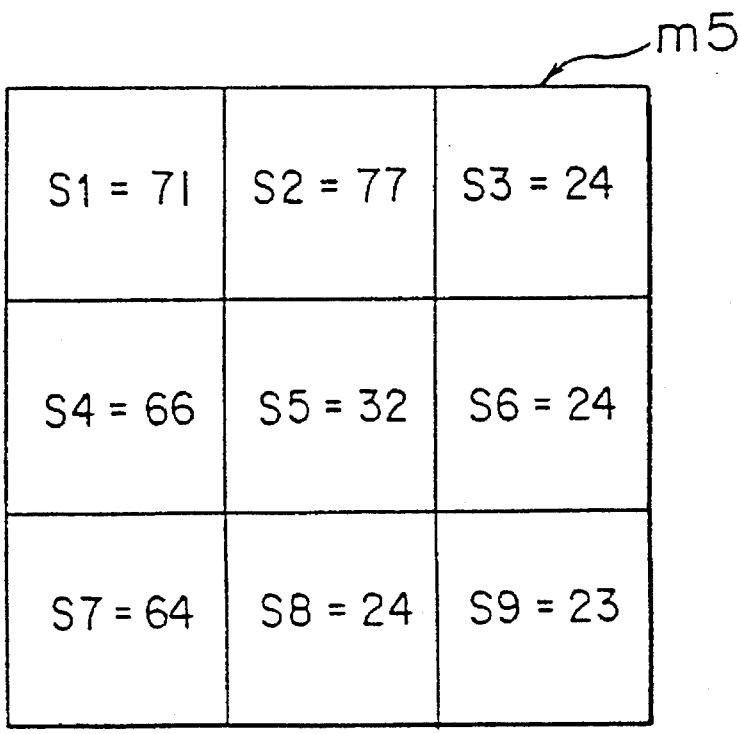
FIGS. 2(a) and 2(b) are diagrams showing an example of the invention wherein a selected pixel is divided into a 3×3 matrix with p=0.5.

FIGS. 2(a) and 2(b) are diagrams showing an example wherein the selected pixel m5 is divided into a (3×3) matrix and P is 0.5 (P=0.5). FIG. 2(a) is an example of density distribution of adjoining pixels including the selected at pixel m5, while FIG. 2(b) is a diagram showing the density distribution in the selected at pixel m5 calculated with P=0.5.

FIG. 3 and FIG. 4 show examples wherein the selected pixel m5 is divided into a (2×2) matrix.

Figure 3A:
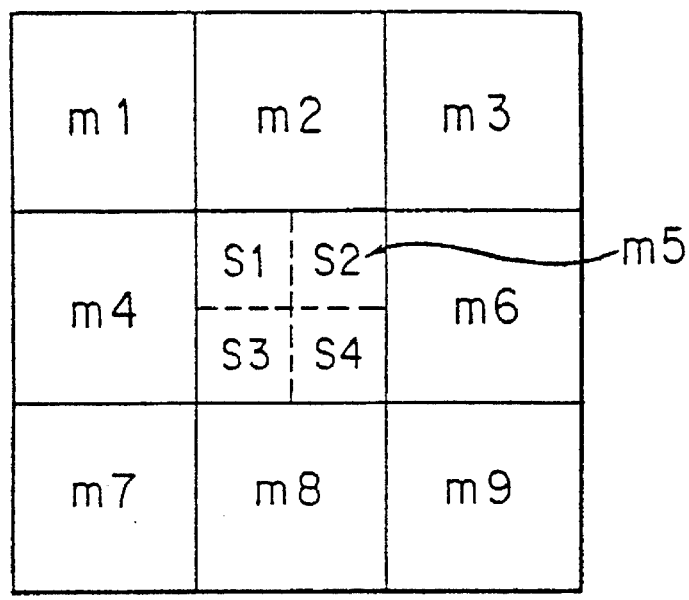
FIG. 3(a) is a diagram showing an example wherein a selected pixel of the invention is divided into a 2×2 matrix.
Figure 3B:
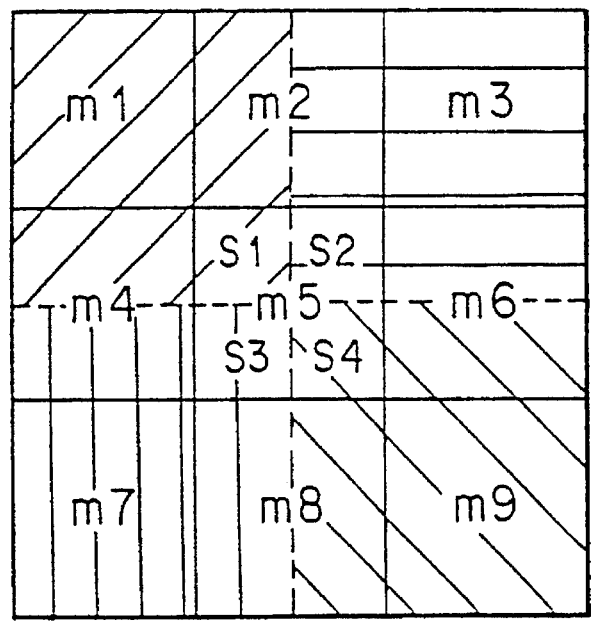
FIG. 3(b) is a diagram showing another example of adjoining pixels relating to small pixels $_s1-_s4$ in the selected pixel.

FIG. 3(a) is a diagram showing an example for dividing the selected pixel m5 into 2×2 and FIG. 3(b) is a diagram showing an example of adjoining pixels related to small pixels s1–s4 in the looked pixel. Calculation of density of s1, s2, s3 and s4 is conducted according to Expression 1.

$$s1 = \frac{4 \times m1 + 2(m2 + m4) + m5}{A} \times m5 \times P + (1-P) \times m5$$

$$s2 = \frac{4 \times m3 + 2(m2 + m6) + m5}{A} \times m5 \times P + (1-P) \times m5$$

$$s3 = \frac{4 \times m7 + 2(m4 + m8) + m5}{A} \times m5 \times P + (1-P) \times m5$$

$$s4 = \frac{4 \times m9 + 2(m6 + m8) + m5}{A} \times m5 \times P + (1-P) \times m5$$

In the above expressions, A is the sum total of m1–m9.

Figure 4A:
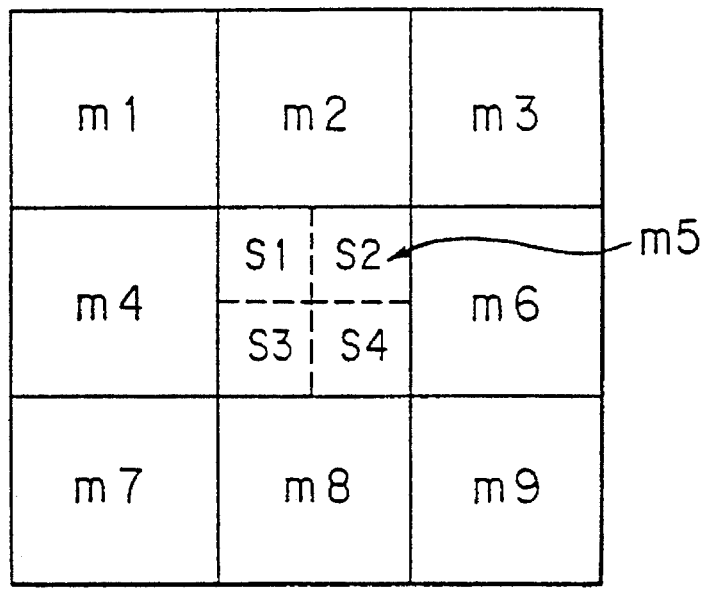
FIG. 4(a) is a diagram showing other example wherein a selected pixel of the invention is divided into a 2×2 matrix.
Figure 4B:
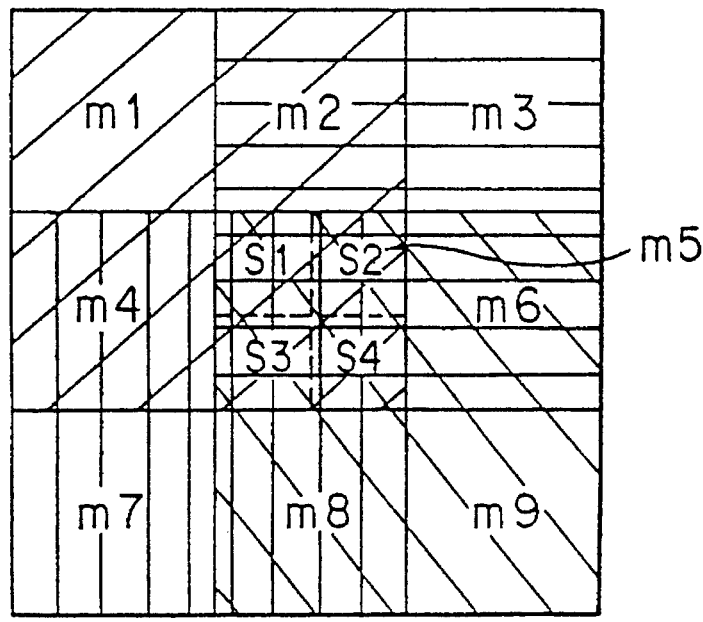
FIG. 4(b) is a diagram showing another example of adjoining pixels relating to small pixels $_s1-_s4$ in the selected pixel.

FIG. 4(a) is a diagram showing another example for dividing the looked pixel m5 into 2×2 likewise and FIG. 4(b) is a diagram showing still another example of adjoining pixels related to small pixels s1–s4 in the looked pixel. Calculation of density for s1, s2, s3 and s4 is conducted according to Expression 2.

Expression 2

$$s1 = \frac{m1 + m2 + m4 + m5}{A} \times 9/4 \times m5 \times P + (1-P) \times m5$$

$$s2 = \frac{m2 + m3 + m5 + m6}{A} \times 9/4 \times m5 \times P + (1-P) \times m5$$

$$s3 = \frac{m4 + m5 + m7 + m8}{A} \times 9/4 \times m5 \times P + (1-P) \times m5$$

$$s4 = \frac{m5 + m6 + m8 + m9}{A} \times 9/4 \times m5 \times P + (1-P) \times m5$$

In the above expression, A is the sum total of m1–m9.

Figure 5:
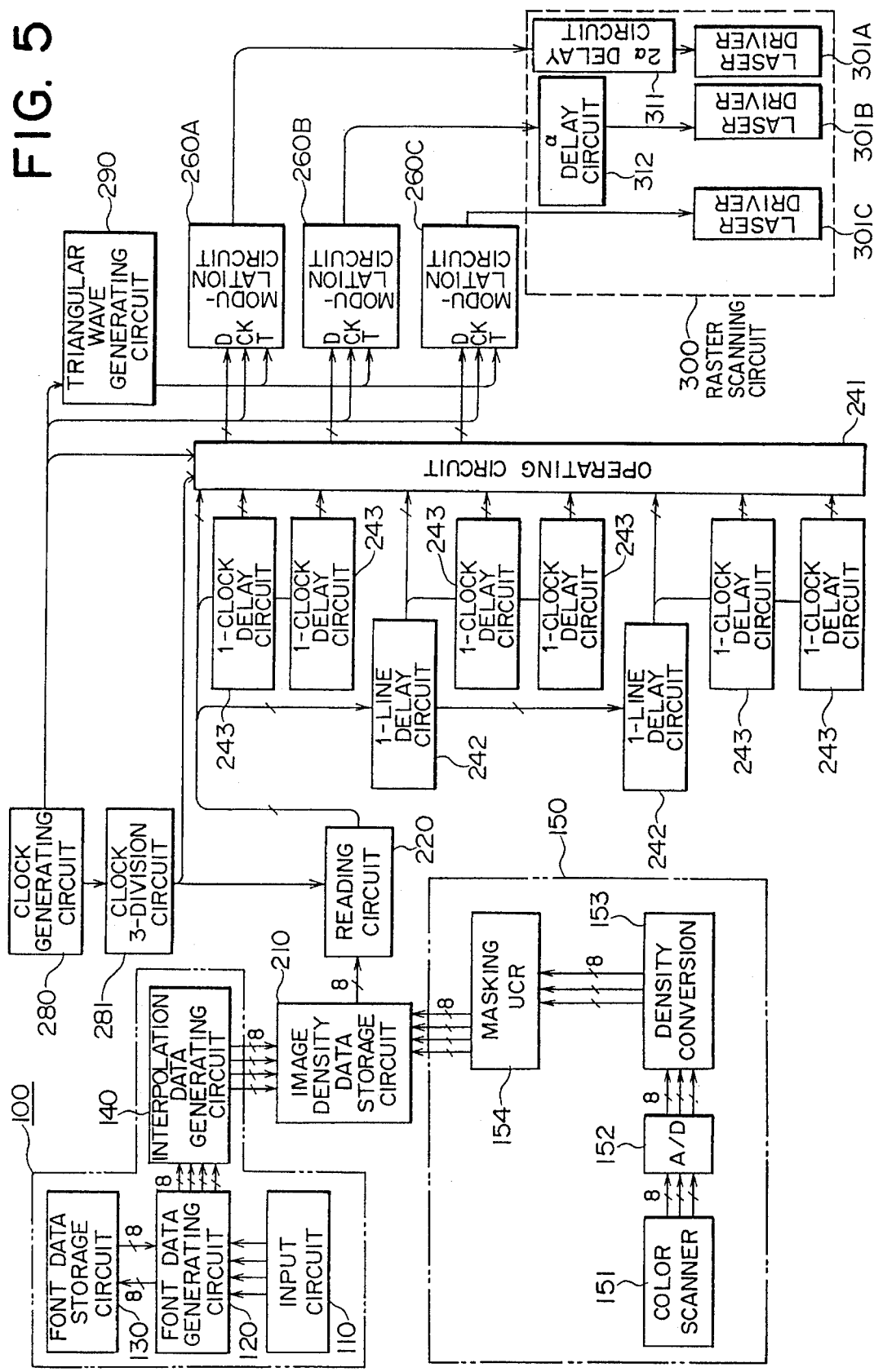
FIG. 5 is a block diagram of an image processing circuit for an example of the image forming apparatus to which the invention is applied.
Figure 6:
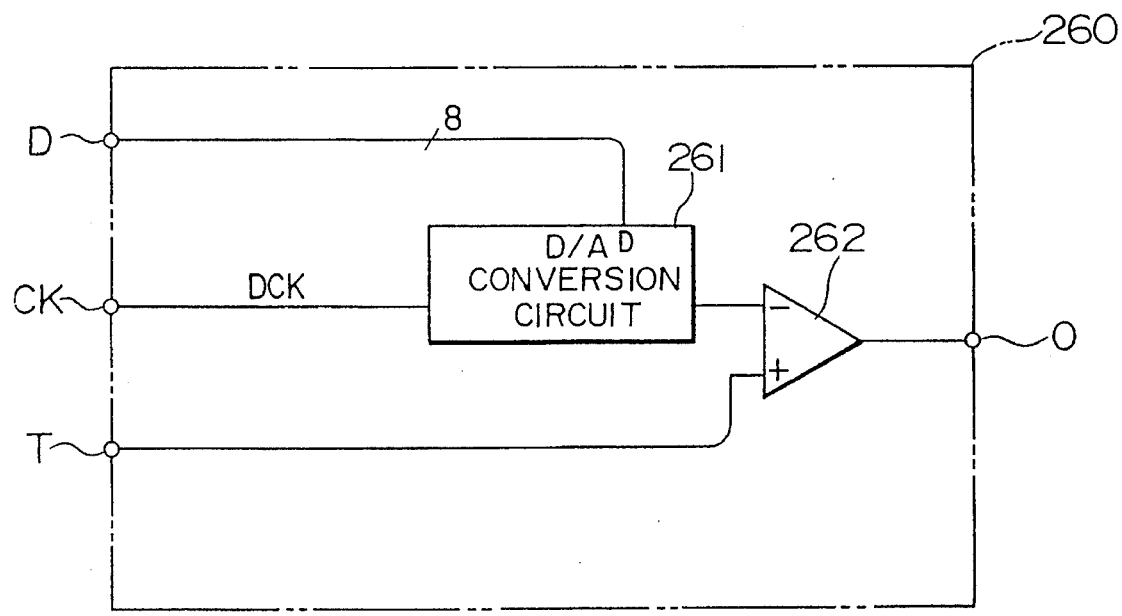
FIG. 6 is a block diagram showing a modulation circuit for the example in FIG. 5.

FIG. 5 is a block diagram (example for dividing the looked pixel into 3×3) showing an example of an image processing circuit used for the image forming apparatus to which the invention is applied. FIG. 6 is a block diagram showing the modulation circuit of the present example.

Image processing circuit 1000 of the present example is a circuit constituting a drive circuit for a scanning optical system and it is composed of image data processing circuit 100, modulated signals generating circuit 200 and raster scanning circuit 300.

Image data processing circuit 100 which interpolates an edge portion of font data and outputs is composed of input circuit 100 composed of a computer, font data generating circuit 120, font data storage circuit 130 and interpolation data generating circuit 140, and it sends character code signals from input circuit 110, size code signals, position code signals and color code signals to font data generating circuit 120. The font data generating circuit 120 selects address signals from four kinds of input signals and sends them to the font data storage circuit 130. The font data storage circuit 130 sends font data corresponding to one character that corresponds to the address signals to the font data generating circuit 120. The font data generating circuit 120 sends font data to the interpolation data generating circuit 140. The interpolation data generating circuit 140 interpolates, using medium density, a serrated or washed portion of image density data produced on the edge portion of the font data and sends them to image density data storage circuit 210 composed of a frame memory. With regard to colors to be generated, the relevant color is converted to density data of each of Y, M, C and BK. Thus, a font is subjected to bit map development in each frame memory with each color having the same form and different density rate.

Modulated signal generating circuit 200 is composed of image density data storage circuit 210, reading circuit 220, operating circuit 241, 1-line-delay circuit 242, 1-clock-delay circuit circuit 243, modulation circuits 260A–260C, clock generating circuit 280, clock 3-division circuit 281 and triangular wave generating circuit 290.

Clock generating circuit 280 is a clock pulse generating circuit and it generates clock pulses having the frequency that is three times higher than that of an original pixel clock before RE-processing. A clock generated from the clock generating circuit 280 is one for a small pixel, and this is called threefold clock $DCK_3$ for convenience' sake and is outputted to clock 3-division circuit 281, operating circuit 241, triangular wave generating circuit 290 and to modulation circuits 260A–260C. The clock 3-division circuit 281 is a circuit that divides frequency of input clock to ⅓ and it outputs a clock pulse whose cycle is identical to that of a clock of an original pixel with frequency that is one-third of threefold clock $DCK_3$. This clock is called reference clock $DCK_0$ for convenience' sake and it is outputted to reading circuit 220 and operating circuit 241.

The image density data storage circuit 210 is a normal page memory (hereinafter referred to simply as page memory 210), and is further a RAM (random access memory) storing with a unit of page, and it has a capacity for the storage of multivalued image density data corresponding to at least one page (equivalent to one image). Further, when it is an apparatus to be employed in a color printer, it is caused to be provided with a page memory capable of storing image density data corresponding to a plurality of colors such as, for example, yellow, magenta, cyan and black.

The reading circuit 220 reads, from the image density data storage circuit (page memory) 220, the image density data corresponding to 3 continuous scanning lines in a unit of one scanning line that continues synchronizing with reference block $DCK_0$ with an index signal as a trigger, and gives, by means of 1-line delay circuit 242, the delay of 2-line scanning time to the image density data corresponding to the first one scanning line out of the aforesaid 3 scanning lines and the delay of 1-line scanning time to the image data corresponding to the middle one scanning line (without giving the delay to the image data corresponding to the last one scanning line). Further, the delays corresponding to 2 reference blocks and 1 reference block are given to each image data through 1-clock delay circuit 243, thereby all image density data for all pixels including a looked pixel and 9 adjoining pixels adjacent to the looked pixel are sent simultaneously to the operating circuit 241.

In the operating circuit 241, RE processing mentioned above is conducted and density data for small pixels are obtained. With regard to density data obtained in the operating circuit 241, the density data for 3 scanning lines for small pixels including a scanning line having s1, s2, s3, . . . in FIG. 1(b), a scanning line having s4, s5, s6, . . . and a scanning line having s7, s8, s9, . . . correspond to the density data for one scanning line for an original pixel. Hereinafter, a scanning line for a small pixel is called a small scanning line. The operating circuit 241 sends to modulation circuits 260A, 260B and 260C the data equivalent to 3 small scanning lines in parallel. In the modulation circuits 260A–260C, pulse-width-modulated signals are generated through modulation conducted by means of a reference wave from triangular wave generating circuit 290, and modulated signals in a unit of 3 small scanning lines (corresponding to one line of original image density data) in which the aforesaid pulse-width-modulated signals continue in parallel are sent to raster scanning circuit 300.

The triangular wave generating circuit 290 conducts, based on threefold clock $DCK_3$, the formation of a wave form of a triangular wave which is a reference wave for a small pixel.

The modulation circuits 260A–260C are of the same circuit composition as shown in FIG. 6 and have therein D/A conversion circuit 261, comparator 262, input portion T for the triangular wave mentioned above, input portion CK for threefold clock $DCK_3$ and input portion D for image density data. In the modulation circuits 260A–260C, image density data sent from the operating circuit 241 are subjected to A/D conversion conducted by D/A conversion circuit 261 in synchronizing with threefold clock $DCK_3$, and are compared with a reference wave of the aforementioned triangular wave in the comparator 262 so that pulse-width-modulated signals may be obtained.

The raster scanning circuit 300 is provided with $2\alpha$-delay circuit 311, laser drivers 301A–301C, an unillustrated index detection circuit and a polygon driver.

The laser drivers 301A–301C conduct, by means of modulated signals from modulation circuits 260A–260C, the oscillation of semiconductor laser array 431 having 3 laser emitting units 431A–431C, and drive them with signals corresponding to the amount of beam light from the semiconductor laser array 431 so that the amount of light therefrom may be constant.

The index detection circuit detects the position of a face of polygon mirror 436 that rotates at a predetermined speed according to index signals from index sensor 439, and conducts, with a cycle in the primary scanning direction, the optical scanning by meas of modulated digital image density signals described later in a raster scanning system. The scanning frequency is 2204.72 Hz, an effective printing width is 297 mm or more and an effective exposure width is 306 mm or more.

The polygon driver causes a DC motor to rotate at a predetermined speed thereby causing polygon mirror 436 to rotate at a speed of rotation of 16535.4 r.p.m.

Figure 11:
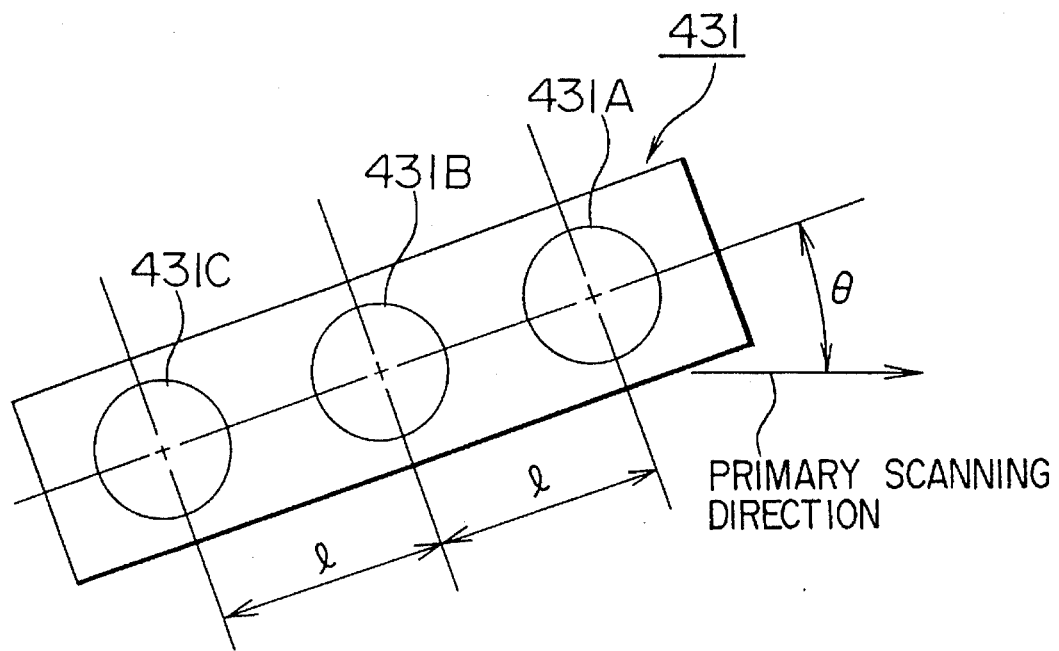
FIG. 11 is a front view showing a semiconductor laser array in the example shown in FIG. 10.
Figure 12:
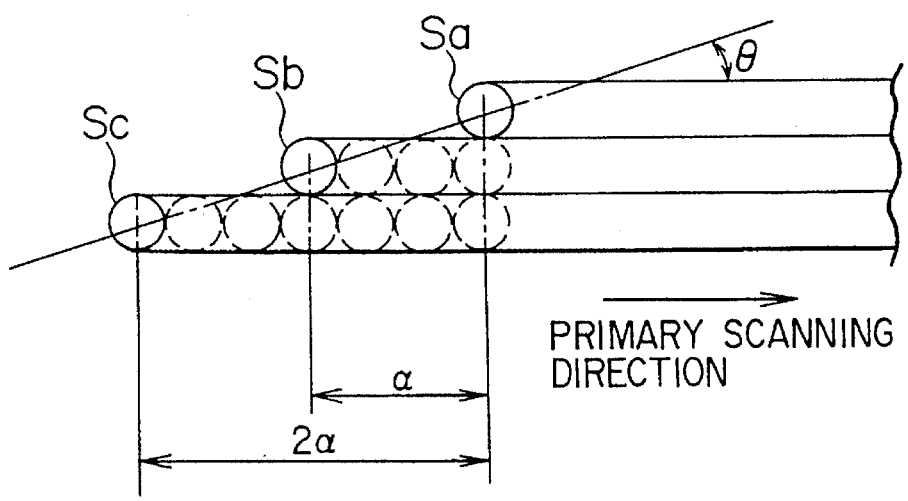
FIG. 12 is a diagram showing a scanning locus of a laser spot generated by the semiconductor laser array.

As the semiconductor laser array 431, the one wherein three emitting units 431A, 431B and 431C are arranged in an array form at regular intervals as shown in FIG. 11 is used. In this case, the emitting units are positioned so that a straight line passing the centers of emitting units 431A, 431B and 431C may be in parallel with a rotation axis of polygon mirror 436 and it may be inclined by a degree of θ against the scanning direction, because it is difficult to cause interval d for emitting units 431A<431B and 431C to be 20 μm or less. In this way, laser spots sa, sb and sc on photoreceptor 401 caused by laser beams coming out of semiconductor laser array 431 may be closely positioned vertically for scanning as shown in FIG. 12. Therefore, positions of the laser spots sa, sb and sc in the scanning direction are deviated in the scanning direction. For example, when the deviation is α and 2α in terms of scanning time, 25-delay circuit 311 delaying by 2α is inserted between modulation circuit 260A and laser driver 301A, and α-delay circuit 312 delaying by α is inserted between modulation circuit 260B and laser driver 301B, both for correcting the deviation. Due to the delayed timing, the deviation is corrected and laser spots sa, sb and sc emitted from semiconductor laser array 431 are recorded after being positioned to be in a line perpendicular to the scanning direction.

When recording time is allowed to be long, semiconductor laser array 431 can be provided with s single emitting unit. In this case, it is possible to follow the manner wherein a memory is further provided in operating circuit 241 and RE-processed small image data are stored tentatively in that memory to be sent, for each small line unit, to modulation circuit 260 where the data are pulse-width-modulated and sent to the laser driver directly without passing through a delay circuit.

The aforesaid image processing circuit 1000 has been explained as a laser printer, but it is not limited to the laser printer only. When it is made to be a circuit that conducts inputting of image density data from a scanner and image processing as image data processing circuit 150 consisting of color scanner 151, A/D converting circuit 152, density converting circuit 153 and masking VCR circuit 154 instead of image data processing circuit 100, it can be applied to other image forming apparatuses such as a copying apparatus and a display unit of a scanning type such as a CRT.

Actions of modulated signal generating circuit 200 will be explained as follows.

FIGS. 7(a), 7(b), 7(c) and 7(d) represent time charts showing the signal at each section of modulated signal generating circuit 200 in the first example.

In FIG. 7, (a) represents D/A converted part of image density data corresponding to one scanning line read from page memory 210 based on reference clock $DCK_0$ with an index signal as a trigger.

Figure 7A:
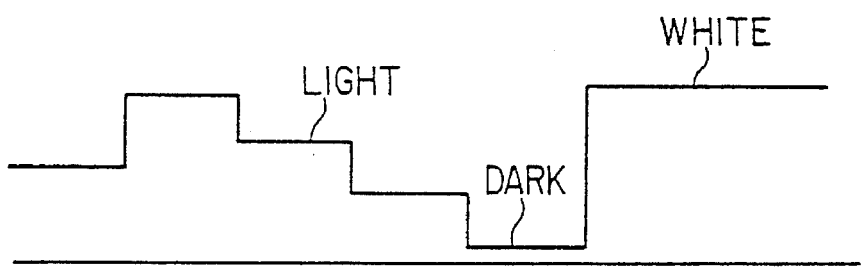
FIGS. 7(a), 7(b), 7(c) and 7(d) are time charts showing signals at each portion of a modulation signal generating circuit in the example of FIG. 5.
Figure 7B:
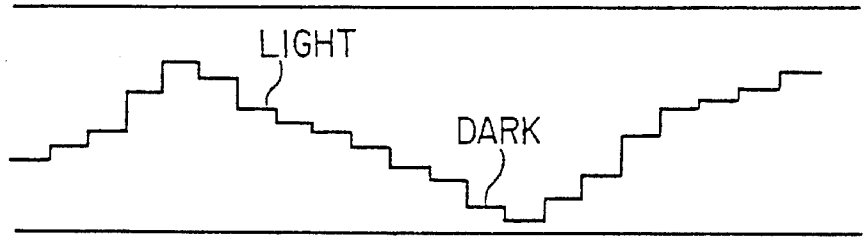
Figure 7C:
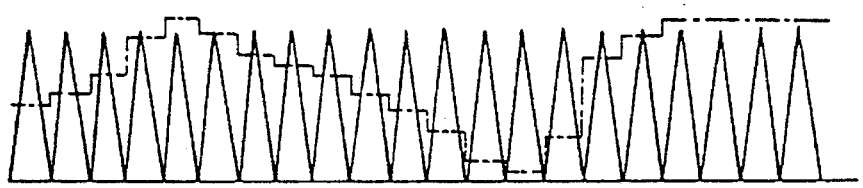

FIG. 7(b) represents a part of image density data for small pixels subjected to RE processings of 3 systems which are RE-processed in operating circuit 241, generated based on threefold clock $DCK_3$ and converted to an analog value by D/A converting circuit 261 in modulation circuit 260, wherein image density data have the same cycle as in a reference wave and a higher level side thereof shows lower density while a lower level side thereof shows higher density FIG. 7(c) shows a reference wave (shown with solid lines) for modulation action in modulation circuit 260 and a part of image data (shown with dashed lines) which have been analog-converted.

Figure 7D:

FIG. 7(d) shows modulation signals to be pulse-width-modulated and outputted by comparator 262.

An example wherein a plurality of selected pixels in u×v (horizontal×vertical) are formed with small pixels in n×m (horizontal×vertical) will be explained next.

FIG. 13(a) is a plan view wherein the aforesaid looked pixels include 2 pixels of $m_6$ and $m_7$ and adjoining pixels including the looked pixels $m_6$ and $m_7$ are represented as $m_1$–$m_{12}$, and FIG. 13(b) is an enlarged view wherein the looked pixels $m_6$ and $m_7$ are divided into small pixels in quantity of 4×3 and small portions are represented by $s_1$–$s_{12}$. Each of $m_1$–$m_{12}$ and $s_1$–$s_{12}$ is assumed to represent its density too.

In detailed explanation of RE processing, the density of small pixel si is determined by the following expression in an example wherein each of the aforesaid looked pixels $m_6$ and $m_7$ is divided into small pixels in quantity of 4×3.

$$s_i = \{6 \times (m_6 + m_7) \times m_i / A\} + (1 - P) \times (m_6 + m_7)/2$$

In the above expression, i=1, 2, ..., 12 and P is a constant that is intensity of RE processing so to speak and its preferable value is within a range of 0.1–0.9. Incidentally, even when P takes 1 for simple processing, a blurring effect to a certain extent can be expected. A is the sum total of $m_1$–$m_{12}$.

In the above expression, a term of $\{6 \times (m_6 + m_7) \times P \times m_i / A\}$ means that density of the selected pixels $m_6$ and $m_7$ multiplied by P is allocated corresponding to the rate of density of adjoining pixels and a term of $(1-P) \times (m_6 + m_7)/2$ means that remaining density of the selected pixels $m_6$ and $m_7$ is allocated uniformly to small pixels, which means that a factor of blur is taken in.

FIG. 14 is a diagram showing an example wherein each of selected pixels $m_6$ and $m_7$ is divided into quantity of 4×3 and P takes 0.5, FIG. 14(a) shows an example of density distribution of adjoining pixels including selected pixels $m_6$ and $m_7$ and FIG. 14(b) is a diagram showing density distribution in looked pixels $m_6$ and $m_7$ calculated with P=0.5.

Next, an example wherein each of the selected pixels $m_6$ and $m_7$ is divided into quantity of 4×2 will be shown in FIG. 3.

FIG. 15(a) is a diagram showing an example wherein each of the selected pixels $m_6$ and $m_7$ is divided into quantity of 4×2 and FIG. 15(b) is an enlarged view showing the occasion wherein each of the selected pixels $m_6$ and $m_7$ is divided into small pixels in quantity of 4×2 small portions (small pixels) are represented by $s_1$–$s_8$, and calculation of density for $s_1$ to $s_8$ can be conducted by the following expression.

Calculation for $s_1$–$s_4$ can be conducted by the following Expression 1.

Expression 1

$$Si = \frac{8 \times mi \times 4 \times m(i+4)}{A} \times \frac{m_6 + m_7}{2} \times P + (1-P) \times \frac{m_6 + m_7}{2}$$

In the above expression, A represents the sum total of $m_1$–$m_{12}$.

Calculation for $s_5$–$s_8$ can be conducted by the following expression Expression 2.

Expression 2

$$Si = \frac{8 \times m(i+4) \times 4 \times mi}{A} \times \frac{m_6 + m_7}{2} \times P + (1-P) \times \frac{m_6 + m_7}{2}$$

In the above expression, A represents the sum total of $m_1$–$m_{12}$.

Figure 16:
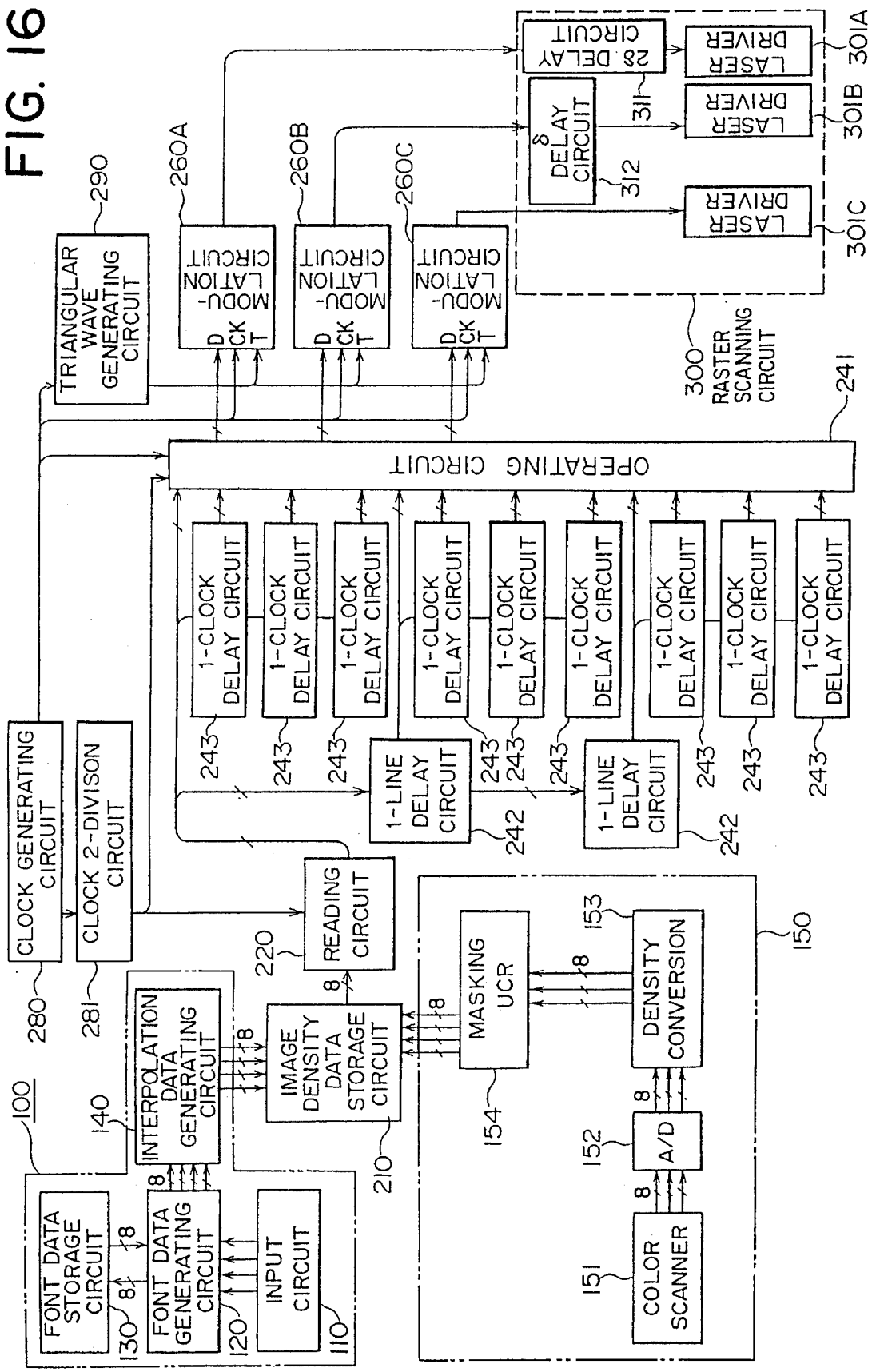
FIG. 16 is a block diagram of an image processing circuit in an example of the image forming apparatus to which the invention is applied.
Figure 17A:
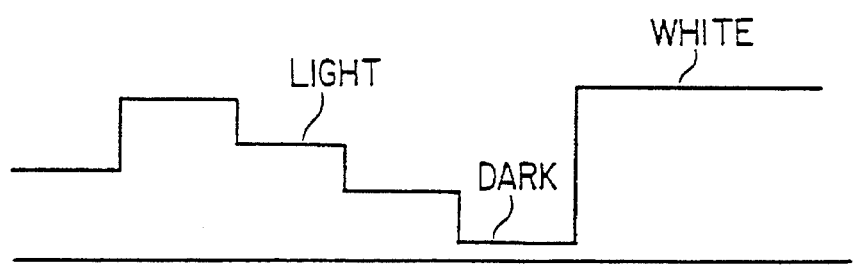
FIGS. 17(a), 17(b), 17(c) and 17(d) are time charts showing signals of each portion in a modulation signal generating circuit of the example in FIG. 16.
Figure 17B:
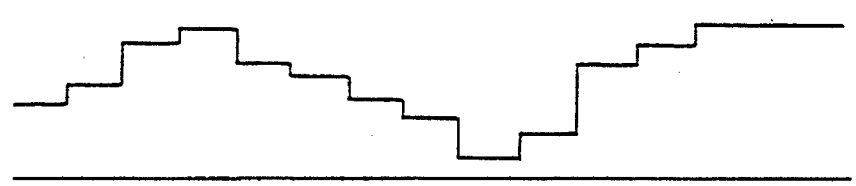
Figure 17C:
Figure 17D:
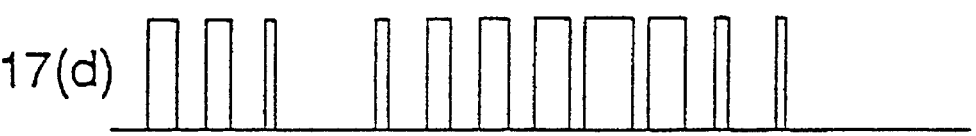

FIG. 16 is a block diagram showing an example of an image processing circuit used in an image forming apparatus to which the invention is applied (example wherein each of two looked pixels is divided into quantity of 4×3).

An image processing circuit in FIG. 16 is mostly the same as that in FIG. 5 in terms of fundamental constitution.

In clock generating circuit 280 in the present example, twofold clock $DCK_2$ having frequency which is twice that of original pixel clock before being RE-processed is generated and consequently clock 2-division circuit 281 that divides frequency of twofold clock $DCK_2$ into a half is used. Further, by giving delays each equivalent to 3 reference clocks, 2 reference clocks and 1 reference clock to each image data by means of 1-clock delay circuit 243, image density data for all 12 pixels including looked pixel and pixels adjoining the looked pixel are sent simultaneously to operating circuit 241.

In the operating circuit 241, RE processing mentioned above is conducted and density data of small pixels are obtained. With regard to the density data of small pixels obtained in the operating circuit 241, data equivalent to 3 scanning lines of small pixels consisting of a scanning line including $s_1$, $s_2$, $s_3$ and $s_4$ in FIG. 13(b), a scanning line including $s_5$, $s_6$, $s_7$ and $s_8$ and a scanning line including $s_9$, $s_{10}$, $s_{11}$ and $s_{12}$ correspond to those of one scanning line of the original pixel. Hereinafter, scanning lines of small pixels are called small scanning lines. The operating circuit 241 outputs in parallel the data equivalent to three small scanning lines to modulation circuits 260A, 260B and 260C. In the modulation circuits 260A–260C, a reference wave from triangular wave generating circuit 290 modulates, and modulated signals wherein a pulse width is modulated are generated, and modulated signals in quantity of a unit of three small scanning lines (equivalent to one line of density data of the original pixel) which continue in parallel are sent to raster scanning circuit 300.

The triangular wave generating circuit 290 forms, based on threefold clock $DCK_2$, a wave form of a triangular wave that is a reference wave for small pixels.

As in FIG. 7, Fig. time charts each representing a signal of each part of modulated signal generating circuit 200 in the present example are shown in FIG. 17.

An image forming process of image forming apparatus will be explained as follows.

First, photoreceptor 401 is charged uniformly by scorotron charging unit 402. Irradiation of laser beam light-modulated by yellow data (8-bit digital density data) coming from image density data storage circuit 210 forms a static latent image corresponding to yellow on the drum-shaped photoreceptor 401. The static latent image corresponding to yellow is subjected to development by means of the first developing unit 441, resulting in the first toner image (a yellow toner image) composed of extremely sharp dots formed on the photoreceptor 401. Before this first toner image is transferred onto a recording paper. the scorotron charging unit 402 charges the photoreceptor 401 again. Then, the laser beam is light-modulated by magenta data (8-bit digital density data) and the modulated laser beam is irradiated on the photoreceptor 401 to form a static latent image. The static latent image is developed by the second developing unit 442 to be the second toner image (a magenta toner image). In the same manner as in the foregoing, the third developing unit develops and the third toner image (a cyan toner image) is formed. Thus, three-color toner image superposed successively is formed on the photoreceptor 401. Finally, the fourth toner image (a black toner image) is formed, and four-color toner image superposed successively is formed on the photoreceptor 401.

In image forming apparatus 400 of the invention, a photoreceptor has excellent high γ characteristics, and due to the excellent high γ characteristics, a latent image can be formed stably even when toner images are repeatedly superposed on a toner image through repeated steps of charging, exposure and development. Namely, even when a laser beam is irradiated on a toner image in accordance with digital signals, a static latent image composed of sharp dots having not fringe can be formed, resulting in a toner image having high sharpness.

These four color toner images are transferred simultaneously by working of transfer unit 462 on a recording paper fed from a paper-feeding unit.

The recording paper carrying transferred toner images is separated from the photoreceptor 401 by separating unit 463, transported by a guide and a conveyance belt to fixing unit 464 where it is heated and fixed to be ejected onto a paper ejection tray.

In the experiments made with various values of constant P used for RE processing in the present example, the value ranging from 0.1 to 0.9 showed satisfactory results. However, it was found that the sharpness of a character is insufficient when the value of P is small, while the edge portion of a character or a line image is emphasized excessively when the value of P is large. Therefore, it has been cleared that the range of 0.3–0.7 is preferable for the value of P.

Heretofore, a moire fringe pattern has tended to appear on a copy from a halftone dot original, and there has been no effective way to eliminate the moire fringe pattern. A dot of a copied image formed through RE processing has been equalized in terms of position to that of the dot on the original, which has exterminated appearance of moire fringe patterns. Further, for an original having thereon characters or line images, edge portions of characters or line images have become clear and it has become possible to reproduce detailed portions even for a small character. In addition, no photograph or the like having thereon a halftone image has been adversely affected The reason for this is that an action of the value of P is small for a halftone image in the present method.

In the invention, it is possible to cause P to be constant for use, but it is preferable to cause P to be variable depending on the type of an image (characters or halftone images) for use. When P takes the value of $P_1$ for characters and $P_2$ for halftone images, the following relation is preferable.

$P_1 > P_2$

Namely, when an image is a character or the like, P is caused to take a large value preferably 0.9–0.4, while when an image is a halftone image, P is caused to take a small value such as 0.6–0.1.

When this function is provided in combination with image discriminating results, it is possible to realize further enhancement of image quality. Or, since the specific characteristic varies depending on an output apparatus such as a printer or a CRT, P is provided to be continuously variable by external commands so that output may be adjustable. Selecting P having an optimum value depending on an output means is an effective means for reducing the difference between apparatuses.

The present image forming method, when it is applied even to the occasion wherein images or characters are indicated through raster scanning such as CRT in addition to a printer, is capable of indicating an excellent image as shown above, As described above, it has become possible to provide an excellent image forming apparatus wherein sharpness of an image formed by means of a scanner, CG or font data can be improved and no moire fringe pattern appears even on a copy from a halftone original, by employing a method wherein a looked pixel is divided into small pixels, and image data subjected to RE processing in which the density of the looked pixel is allocated in accordance with density data distribution of adjoining pixels including the looked pixel are modulated by reference wave signals to generate modulated signals, and the modulated signals record images based on density of small pixels.

Further, an effect of the invention has been successfully improved by selection of constant P used in RE processing mentioned above and characteristics of a photoreceptor.

Another example of image forming of the invention will be explained, next. In the image forming method, one selected pixel portion of image density data is composed of small pixels having n×m (horizontal×vertical) pixels and the density data distribution of the adjoining pixels including the selected pixel is converted to the distribution of the small pixels having n×m pixels in the aforementioned selected pixel, and the image density data of the small pixels of each line obtained by distributing the data of the selected pixel multiplied by the constant P according to the aforesaid distribution are used for image formation wherein a reference wave with a different phase is selected. This selected reference wave modulates density data of the looked pixel mentioned above. Based on the image density data subjected to RE processing, one reference wave is selected from reference waves with different phases, and pulse-width-modulated image signals obtained by combining the selected reference wave and original image data are used for forming an image.

Figure 18:
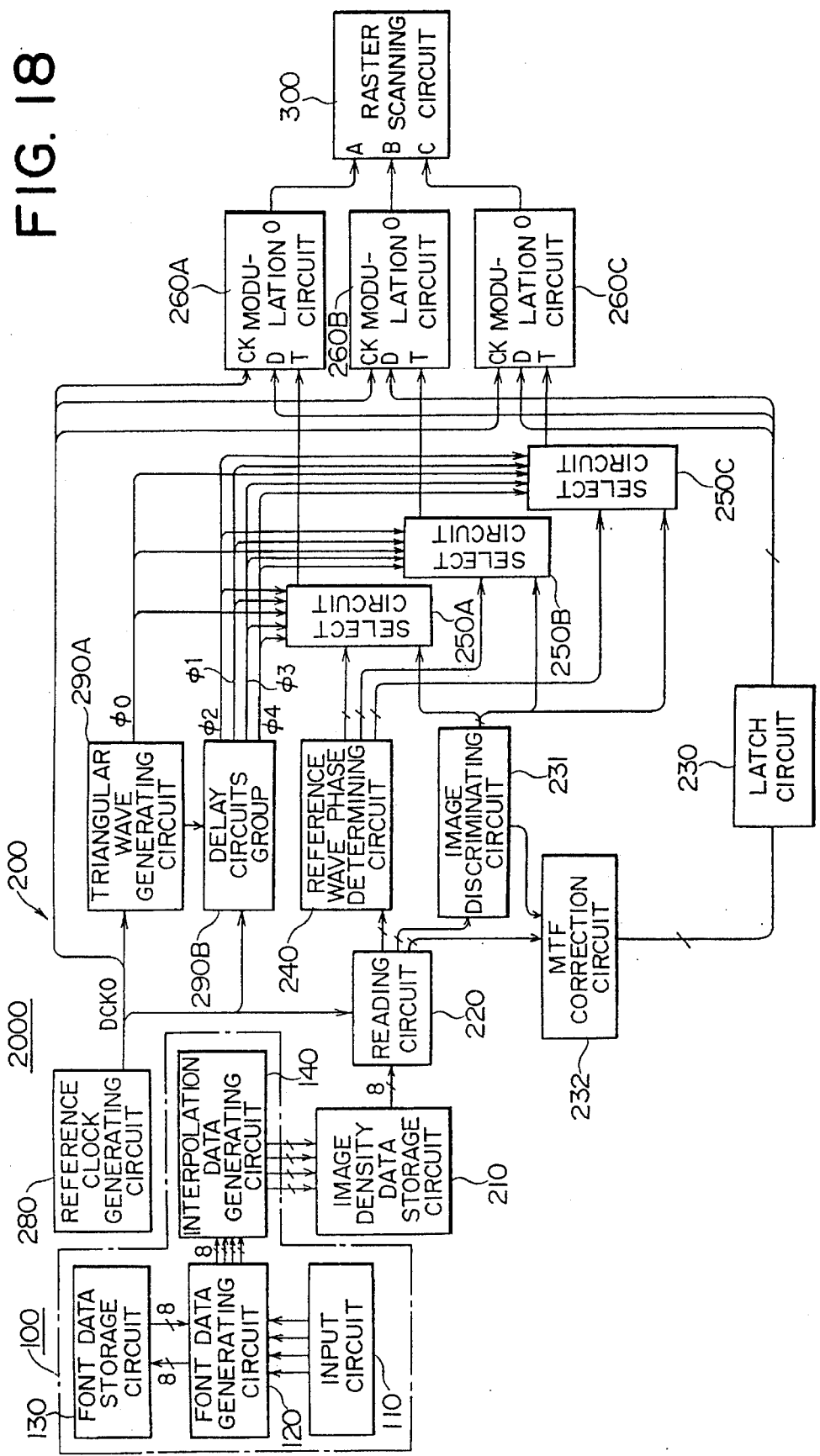
FIG. 18 is a block diagram of an image processing circuit in an example of the image forming apparatus of the invention.
Figure 19:
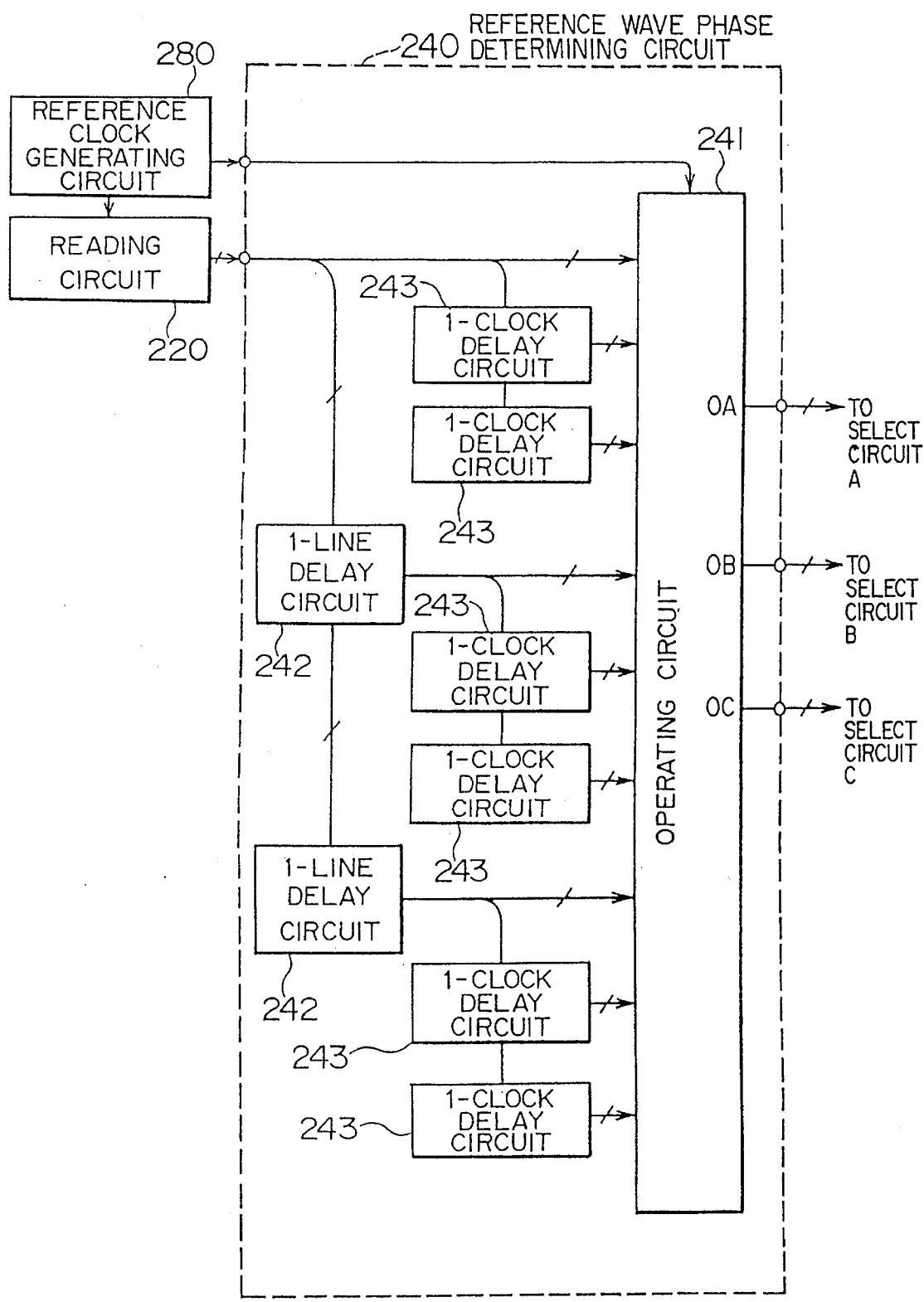
FIG. 19 is a block diagram showing an example of a circuit for determining a phase of a reference wave in the circuit in FIG. 18.
Figure 20:
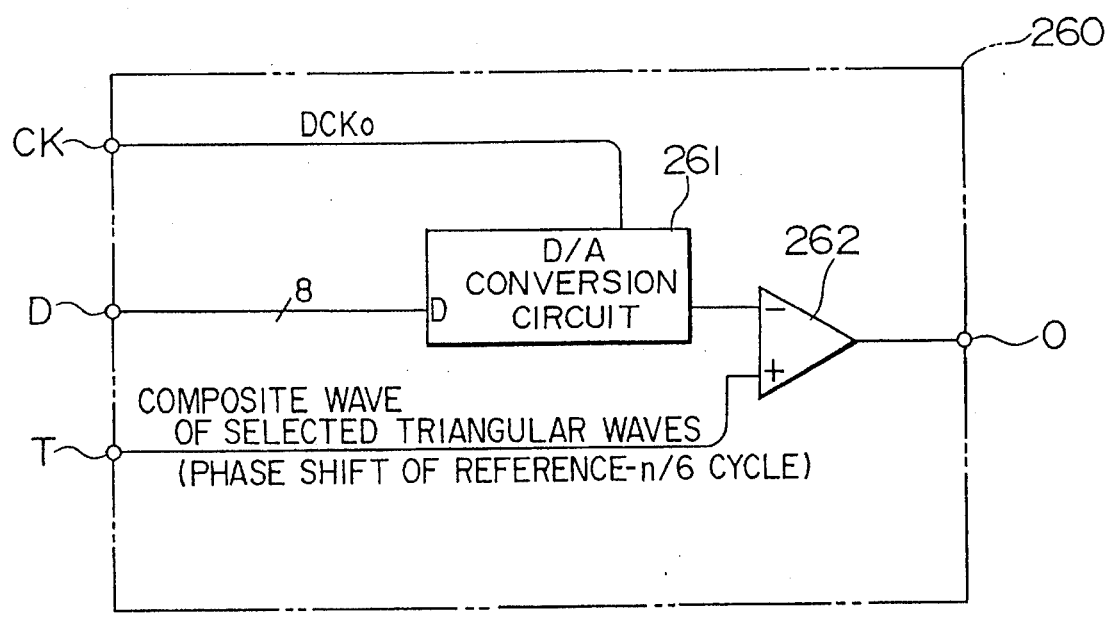
FIG. 20 is a block diagram showing an example of a modulation circuit in the circuit in FIG. 18.

FIG. 18 is a block diagram showing an example of an image processing circuit used in an image forming apparatus of the invention (an example wherein a pixel is divided into quantity of 3×3), FIG. 19 is a block diagram showing a circuit for determining the phase of a reference wave in the present example and FIG. 20 is a block diagram showing a modulation circuit of the present example.

Image processing circuit 1000 of the present example is a circuit that constitutes a driving circuit for a scanning optical system and it is composed of image data processing circuit 100, modulated signal generating circuit 200 and raster scanning circuit 300.

Image data processing circuit 100 is a circuit that interpolates edge portions of font data and outputs and it is composed of input circuit 110 consisting of a computer, font data generating circuit 120, font data storage circuit 130 and interpolation data generating circuit 140. It sends character code signals from input circuit 110, size code signals, position code signals and color code signals to font data generating circuit 120. The font data generating circuit 120 selects address signals from input signals in four kinds and sends them to font data storage circuit 130. The font data storage circuit 130 sends font data corresponding to a character that corresponds to address signals to font data generating circuit 120. The font data generating circuit 120 sends font data to interpolation data generating circuit 140. The interpolation data generating circuit 140 interpolates serrated portions or washed-off portions of image density data produced on the edge of font data by using medium density and sends them to image density data storage circuit 210 consisting of a frame memory. With regard to colors generated, relevant colors are converted to density data of Y, M, C and BK in accordance with a color code. Thus, bit-map development of font is conducted in each frame memory with each color having the same shape and different density rate.

Modulated signal generating circuit 200 is composed of image density data storage circuit 210, reading circuit 220, latch circuit 230, image discriminating circuit 231, MTF correction circuit 232, reference wave phase determining circuit 240, select circuits 250A–250C, modulation circuits 260A–260C, reference clock generating circuit 280, triangular wave generating circuit 290A and delay circuits group 290B.

Image density data storage circuit 210 is usually a page memory (hereinafter referred to simply as page memory 210) and is further a RAM (random access memory) that stores with a unit of a page, and it has capacity to store multi-valued image density data corresponding to at least one page (equivalent to one image screen). Further, when it is employed in a color printer, it is required to have a page memory which is enough to store image density signals corresponding to a plurality of colors, such as, for example, yellow, magenta, cyan and black.

The reading circuit 220 reads continuous image density data in a unit of one scanning line that continues synchronizing with reference clock $DCK_0$ with index signals as a trigger from image density data storage circuit (page memory) 210, and sends them to reference wave phase determining circuit 240, image discriminating circuit 231 and to MTF correction circuit 232.

The latch circuit 230 is a circuit that latches image density data only when the reference wave phase determining circuit 240 is processing which is described later.

The reference clock generating circuit 280 is a pulse generating circuit, and it generates pulse signals with a repeated cycle which are the same as a pixel clock, and sends them to reading circuit 220, triangular wave generating circuit 290A, delay circuit group 290B and modulation circuits 260A–260C. For convenience' sake, this clock is called reference clock $DCK_0$.

The numeral 290A is a triangular wave generating circuit and it forms, based on reference clock $DCK_0$, a wave form of reference triangular wave $\emptyset_0$ that is a reference wave with the same cycle as a pixel clock. In delay circuits group 290B, a plurality of clocks $DCK_1$–$DCK_4$ each having a phase difference of 1/n cycle (⅙ cycle in the present example) against reference clock $DCK_0$ are generated. Based on the generated clocks, triangular waves $\emptyset_1$–$\emptyset_4$ which are reference waves each having different phase (in the present example, triangular wave $\emptyset_1$ delayed by ⅙ cycle, triangular wave $\emptyset_2$ delayed by ⅔ cycle, triangular wave $\emptyset_3$ advanced by ⅙ cycle and triangular wave $\emptyset_4$ advanced by ⅔ cycle) are outputted.

The select circuits 250A–250C have an input portion of triangular waves $\emptyset_1$–$\emptyset_4$ deviated in phase from the aforesaid reference triangular wave $\emptyset_0$, and selects one triangular wave from the above-mentioned triangular waves by means of a selected signal from reference wave phase determining circuit 240 described later, and outputs it to composite circuits 270A–270C. In the composite circuits 270A–270C, triangular waves inputted in succession from select circuits 250A–250C are composed and they are sent to input terminal T of modulation circuits 260A–260C.

The modulation circuits 260A–260C are the same in circuit composition as shown in FIG. 20 and they respectively have D/A conversion circuit 261, comparator 262, and input portion T of composite wave of triangular waves. Image density data sent from latch circuit 230 are D/A-converted by D/A converting circuit 261 while they are synchronized with reference clock $DCK_0$, and are compared with the aforesaid triangular wave sent from the select circuits 250A–250C as a reference wave. Thus, pulse-width-modulated signals are obtained.

The reference wave phase determining circuit 240 is composed of 1-line delay circuit 242, 1-clock delay circuit 243 and operating circuit 241 as shown in FIG. 19. The 1-line delay circuit 242 gives a delay of 2-line scanning time to the image density data for the first scanning line in the image density data for 3 scanning lines sent one line by one line mentioned above, and a delay of 1-line scanning time to the image data for the middle one scanning line (without giving a delay to the image data for the last scanning line). Further, 1-clock delay circuit 243 gives a delay equivalent to 2 reference clocks or 1 reference clock to each image data, and sends image density data for all pixels including a looked pixel and pixels adjoining the looked pixel to the operating circuit 241 simultaneously.

In the operating circuit 241, the above-mentioned RE processing is conducted and density data of small pixels are obtained. The density data of small pixels thus obtained are divided into a small scanning line including s1, s2, s3, ... in FIG. 5, a small scanning line including s4, s5, s6, ... and a small scanning line including s7, s8, s9, ... and these 3 small scanning lines of small pixels correspond one scanning line of the original pixel.

The operating circuit 241 conducts operation for obtaining the center of gravity of density data in original one pixel of each small scanning line, and outputs from output terminal OA the select signals which vary depending on the center of gravity obtained. Namely, it outputs from the output terminal OA to select circuit 250A the signal for selecting reference triangular wave $\emptyset_0$ having no phase displacement when the center of gravity of s1, s2 and s3 (first small scanning line) of pixel m5 is located in the vicinity of the center of s2, the signal for selecting triangular wave $\emptyset_1$ having the phase delayed by ⅙ cycle when the center of gravity is in the vicinity of the boundary between s2 and s1, the signal for selecting triangular wave $\emptyset_2$ having the phase delayed by ⅔ cycle when the center of gravity is in the vicinity of the center of s1, the signal for selecting triangular wave $\emptyset_3$ having the phase advanced by ⅙ cycle when the center of gravity is in the vicinity of the boundary between s2 and s3, and the signal for selecting triangular wave $\emptyset_4$ having the phase advanced by ⅔ cycle when the center of gravity is in the vicinity of the center of s3. Likewise, output terminal OB outputs the triangular wave selection signal for the second small scanning line that depends on the center of gravity of density for s4, s5 and s6 in pixel m5 to select circuit 250B, and output terminal OC outputs the triangular wave selection signal for the third small scanning line that depends on the center of gravity of density for s7, s8 and s9 in pixel m5 to select circuit 250C. FIG. 21 is a diagram showing an example of the relation between the triangular waves having different phases mentioned above and the above-mentioned looked pixel.

On the other hand, image discriminating circuit 231 discriminates an image among character/halftone-image/dot-image, and when the image is discriminated as a character or a dot image, the above-mentioned reference wave phase determining circuit 240 is operated and image data are sent, without being processed, to modulation circuits 260A–260C through latch circuit 230, with MTF correction circuit 232 being out of operation. When discriminated to be a halftone image, the reference wave phase determining circuit 240 does not select a triangular wave, modulation using only reference triangular wave $\varnothing_0$ conducted, and image data read by reading circuit 220 are corrected by MTF correction circuit 232 and then sent to modulation circuits 260A–260C through latch circuit 230.

In the modulation circuits 260A–260C, signals of image data representing image density information inputted by a specific reference wave having a different phase mentioned above through the latch circuit 230 are modulated and thereby the modulated signals wherein a pulse width has been modulated are generated. The modulated signals are sent to raster scanning circuit 300 with a unit corresponding to 3 small scanning lines wherein the modulated signals continue in parallel (equivalent to one line of original image density data).

FIG. 22 is a time chart showing signals at portions of a modulated signal generating circuit in the present example.

In the figure, (a) shows a part of image density data read from page memory 210 based on reference clock $DCK_0$ with an index signal as a trigger. The image density data are converted by D/A converting circuit 261 into analog values wherein the higher level side shows lower density and the lower level side shows higher density.

(b) shows a triangular wave that is a reference wave outputted from select circuit 250 in succession.

(c) shows a reference wave (shown with solid lines) wherein the above-mentioned triangular waves are composed and the image density signals (shown with dashed lines) converted to the analog values.

(d) shows pulse-width-modulated signals generated through comparison conducted by comparator 262.

The results of generation of modulated signals mentioned above show that the invention emphasizes an edge portion having density that changes sharply to reproduce characters and line images sharply, while the edge portion remains to be halftone under the modulation by means of conventional triangular waves wherein phases are not deviated.

After experiments wherein the value of constant P was changed variously in the present example, favorable images were obtained with the value of P ranging from 0.1 to 0.9 and excellent images were obtained by the range of 0.4–0.5 in particular. Namely, edge portions for the original of characters or line images which used to be blurred appeared to be sharp, and even a small character was reproduce in detail. In addition, photographs having therein halftone images were not adversely affected.

Figure 23:
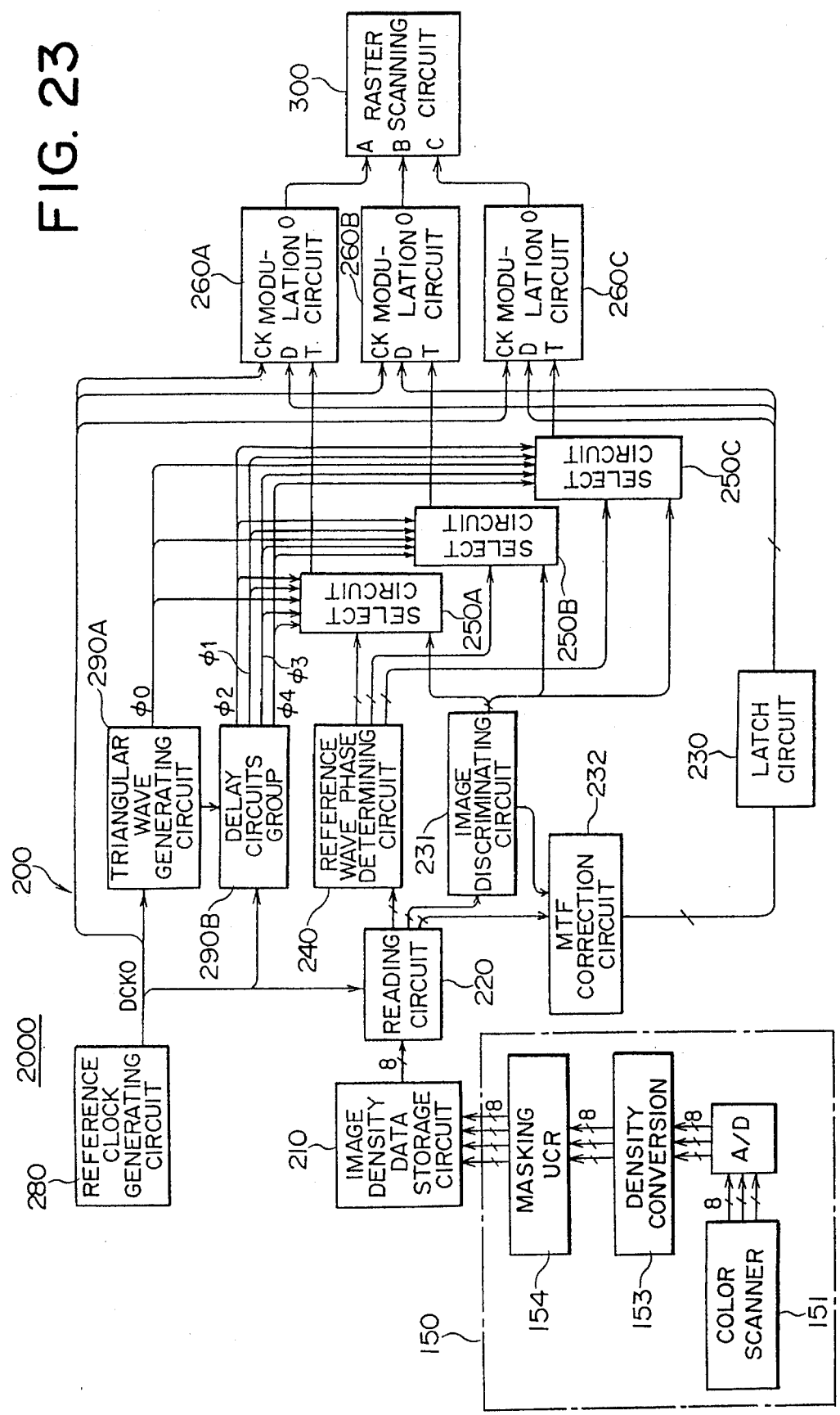
FIG. 23 is a block diagram showing an image processing circuit in other example of the invention.

FIG. 23 is a block diagram showing another example of an image processing circuit used for an image forming apparatus in the other example of the invention, which is for a color copying machine having the structure shown in FIG. 10 and conducting color image recording in succession. As shown in the figure, the image processing circuit is the same as that in FIG. 18 except image data processing circuit 150, and image data processing circuit 100 is replaced by image data processing circuit 150 consisting of color scanner 151, A/D converting circuit 152, density converting circuit 153 and masking UCR circuit 154 so that image data for each color may be transferred by selector 155. After that, the image density data are subjected to record density distribution and phase selection for a reference wave in succession in the same manner as in the example in FIG. 18, and the reference wave mentioned above modulates the image data. This image processing circuit can be applied to an image forming apparatus such as a copying apparatus. Due to the circuit, an image having high sharpness was obtained similarly to the example in FIG. 18.

As described above, an image forming apparatus wherein a looked pixel is divided into small pixels, density of the small pixel selects a phase of a reference wave from image data subjected to RE processing in which density of the looked pixel is allocated in accordance with the distribution of density data of adjoining pixels including the looked pixel, and the reference wave modulates the density signals of the looked pixel to generate modulated signals which are used for recording images, proved to be an excellent image forming apparatus wherein the sharpness of an image formed by a scanner, C.G. or font data can be improved and no moire stringe pattern appears even on a copy from an original of halftone images.

It was possible to attain further improvement of the effect of the invention by scanning the above-mentioned one pixel with a plurality of recording beams and by using a high $\gamma$ photoreceptor Explanation will be made as follows for an example wherein a phase of a reference wave used for pulse-width-modulation is delayed with a unit of $M/(n+1)$ seconds when clock time of pixel clock is assumed as M and the aforesaid n is odd, while it is delayed with a unit of $M/(n+2)$ seconds when n is even, in an image forming apparatus wherein high density image recording is conducted by dividing a pixel into quantity of n×n and by scanning with a plurality of pulse-width-modulated laser beams.

Figure 30:
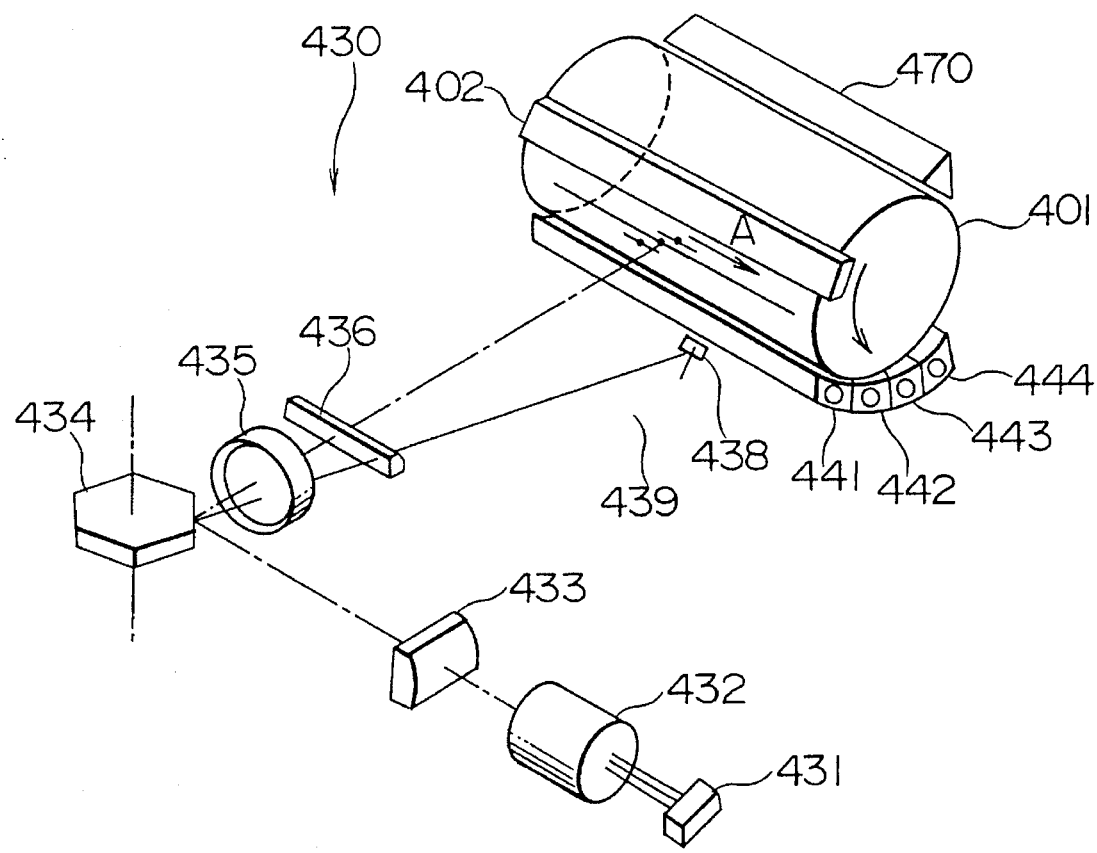
FIG. 30 is a perspective view showing rough structure of an example of the image forming apparatus of the invention.

FIG. 30 is a perspective view showing a schematic constitution of an image forming apparatus in the present example.

In image forming apparatus 400, a photoreceptor is uniformly charged, and then, based on modulated signals obtained through differential amplification of analog image density data obtained by D/A-converting digital image density data from a computer or a scanner and reference wave signals, a static latent image composed of dots is formed by pulse-width-modulated spot light, the static latent image is subjected to reversal development by means of toner to be a toner image composed of dots, above-mentioned steps of charging, exposure and development are repeated to form a color toner image on the photoreceptor, the color toner image is transferred onto a recording paper, separated from the photoreceptor and fixed to obtain a color image, in which the aforesaid pulse-width modulation changes an area of a dot for indication of gradation. With regard to image signals made by a computer as described above or read by a scanner, when an edge portion with high image density interferes with reading pixels, signals in the relevant pixel becomes identical to the medium density in the uniform image. In addition, in the conventional pulse-width-modulation, all it can do is just a coarse presentation because a recording dot is formed at the center of a pixel either in the recording on the edge portion or in the recording on the halftone area.

In the image forming apparatus of the invention, therefore, a plurality of laser beams are used for recording one pixel, and a latent image of recording dots is moved in the primary scanning direction and the sub-scanning direction, or it is enlarged in the all directions for fine and delicate presentation.

The image forming apparatus 400 is composed of drum-shaped photoreceptor (hereinafter referred to simply as a photoreceptor) rotating in the arrowed direction, scorotron charging unit 402 that charges the photoreceptor 401 uniformly, scanning optical system 430, developing units 441–444 each containing yellow toner, magenta toner, cyan toner and black toner, and cleaning unit 470.

In the scanning optical system 430, a plurality of laser beams (3 beams in the present example) emitted from semiconductor laser array 431 are collimated by collimator lens 432 to be a laser beam. The laser beam is reflected and deflected by rotary polygon mirror 434 that rotates at a constant speed for the imagewise exposure on the peripheral surface of the photoreceptor 401 charged uniformly conducted by a fine laser spot prepared by fθ lens 435 and cylindrical lenses 433 and 436. In this case, the fθ lens 435 is a correction lens for optical scanning, and cylindrical lenses 433 and 436 are lenses for correcting variation of spot position caused by inclination of the polygon mirror 434. The numeral 438 is a mirror for indexing and 439 is an index sensor. A surface position of rotary polygon mirror 434 that rotates at a predetermined speed is detected by means of index signals from the index sensor 439, and thus a cycle in the primary scanning direction is detected. Owing to this, the photoreceptor 401 is scanned in parallel with a drum shaft by the aforementioned laser spot.

The present example shows an image forming apparatus wherein a pixel is divided into quantity of 3×3 for recording. In semiconductor laser array 431 in the image forming apparatus, semiconductor lasers 431a–431c are arrayed on a base board at intervals, for example, of 0.1 mm. GaAlAs or the like is used for the semiconductor lasers 431a–431c whose maximum output is 5 mW and optical efficiency is 25%. Since a plurality of color toner images are superposed one by one on the photoreceptor 401, exposure by means of light having a wavelength that causes less absorption in colored toners is preferable, and the wavelength in this case is 800 nm.

Figure 24:
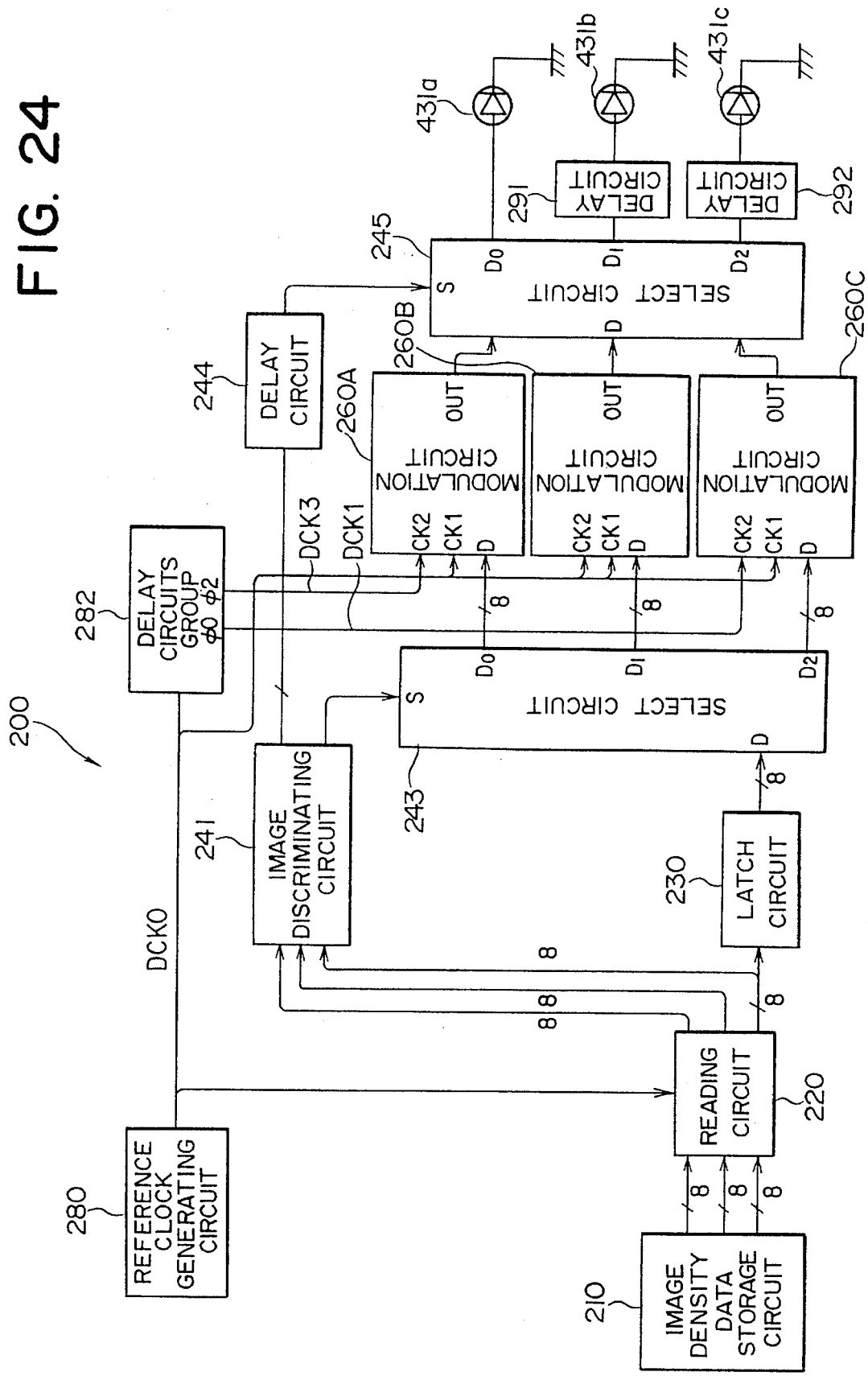
FIG. 24 is a block diagram of an image processing circuit in an example of the image forming apparatus of the invention.
Figure 25:
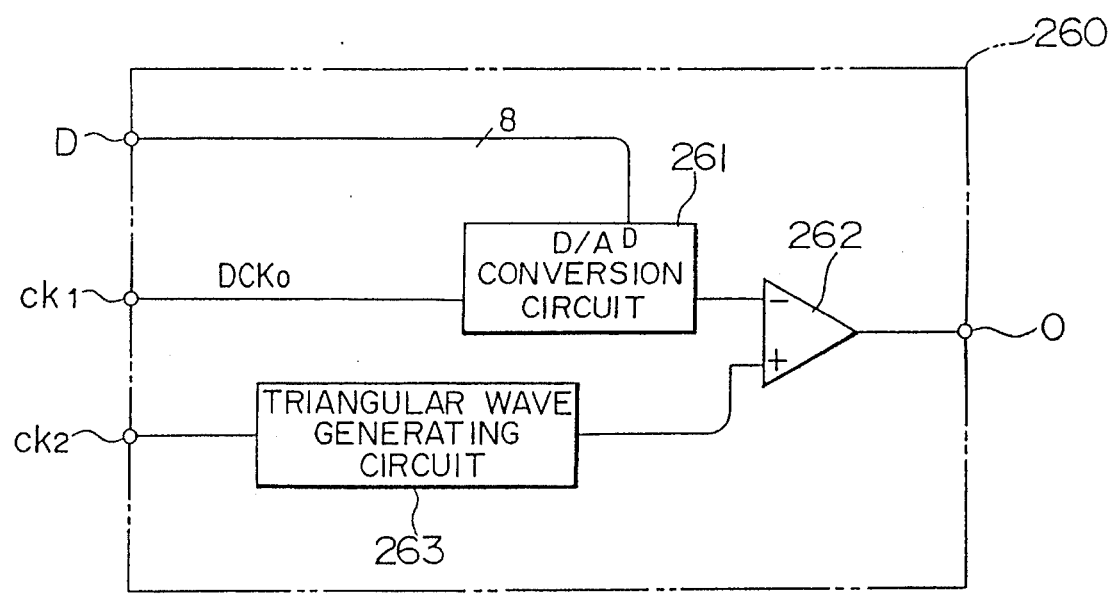
FIG. 25 is a block diagram showing an example of a modulation circuit in the circuit in FIG. 24.

FIG. 24 is a block diagram showing an example of an image processing circuit used in an image forming apparatus of the invention (an example wherein a pixel is divided into quantity of 3×3), and FIG. 25 is a block diagram showing a modulation circuit in the present example.

Image processing circuit 200 in the present example is a circuit that drives semiconductor laser array 431 by the use of modulated signals obtained by pulse-width-modulating image density data, and it is composed of image density data storage circuit 210, reading circuit 220, latch circuit 230, image discriminating circuit 241, select circuits 243 and 245, modulating circuits 260A–260C, reference clock generating circuit 280, delay circuits group 282 and delay circuits 244, 291 and 292.

Image density data storage circuit 210 is usually a page memory (hereinafter referred to simply as page memory 210) and is further a RAM (random access memory) that stores with a unit of a page, and it has capacity to store multi-valued image density data corresponding to at least one page (equivalent to one image screen). Further, when it is employed in a color printer, it is required to have a page memory which is enough to store image density signals corresponding to a plurality of colors, such as, for example, yellow, magenta, cyan and black.

The reading circuit 220 reads image density data in the lateral direction, vertical direction and diagonal direction for 3 adjoining scanning lines, for example, synchronizing with reference clock $DCK_0$ with index signals as a trigger, from image density data storage circuit (page memory) 210 to image discriminating circuit 241, and sends image density data corresponding to the recording central scanning line among the 3 scanning lines to the latch circuit 230.

The latch circuit 230 is a circuit that latches image density data only when the image discriminating circuit 241 is processing.

The reference clock generating circuit 280 is a pulse-generating circuit and it generates pulse signals with a cycle period identical to that of a pixel clock to send them to reading circuit 220, delay circuits group 282 and modulating circuits 260A–260C. For convenience' sake, the clock is called reference clock $DCK_0$.

In the delay circuits group 282, a plurality of pixel clocks $DCK_1$–$DCK_m$ each having a phase difference of a predetermined cycle against the reference clock $DCK_0$ are generated, and they are outputted to modulation circuits 260A–260C.

The predetermined cycle mentioned above varies depending on n for dividing one pixel into quantity of n×n, and it is delayed with a unit of $M/(n+1)$ seconds when clock time of pixel clock is assumed as M and the aforesaid n is odd, while it is delayed with a unit of $M/(n+2)$ seconds when n is even ... In the delay circuits group 291, therefore, clocks each being delayed against the reference clock $DCK_0$ by $1 \times M/(n+1)$ seconds $2 \times M/(n+1)$ seconds, $3 \times M/(n+1)$ seconds, ... respectively are generated when n is odd, and clock $DCK_1$ delayed by $M/4$ seconds is outputted from terminal $\phi_0$ in the case of n=3, for example, and clock $DCK_3$ delayed by $3 \times M/4$ seconds is outputted from terminal $\phi_2$.

Further, clocks each being delayed against the reference clock $DCK_0$ by $1 \times M/(n+1)$ seconds $2 \times M/(n+1)$ seconds, $3 \times M/(n+1)$ seconds, ... respectively are generated when n is even, and clock delayed by $M/4$ seconds is outputted from terminal $\phi_0$ in the case of n=2, for example, and clock delayed by $3 \times M/4$ seconds is outputted from terminal $\phi_2$.

The modulation circuits 260A–260C are of the same circuit composition as shown in FIG. 25 and each of them is composed of D/A conversion circuit 261, comparator 262 and triangular wave generating circuit 263 that generates triangular waves. In the modulation circuit, image density data sent from select circuit 243 are D/A-converted by D/A converting circuit 261 synchronizing with reference clock $DCK_0$ and are compared with a reference wave that is a triangular wave generated by triangular wave generating circuit 263 for obtaining pulse-width-modulated signals. In all modulation circuits 260A–260C, image density data are D/A-converted by reference clock $DCK_0$ and a phase of each clock to be inputted into triangular wave generating circuit 263 is different.

Figure 26:
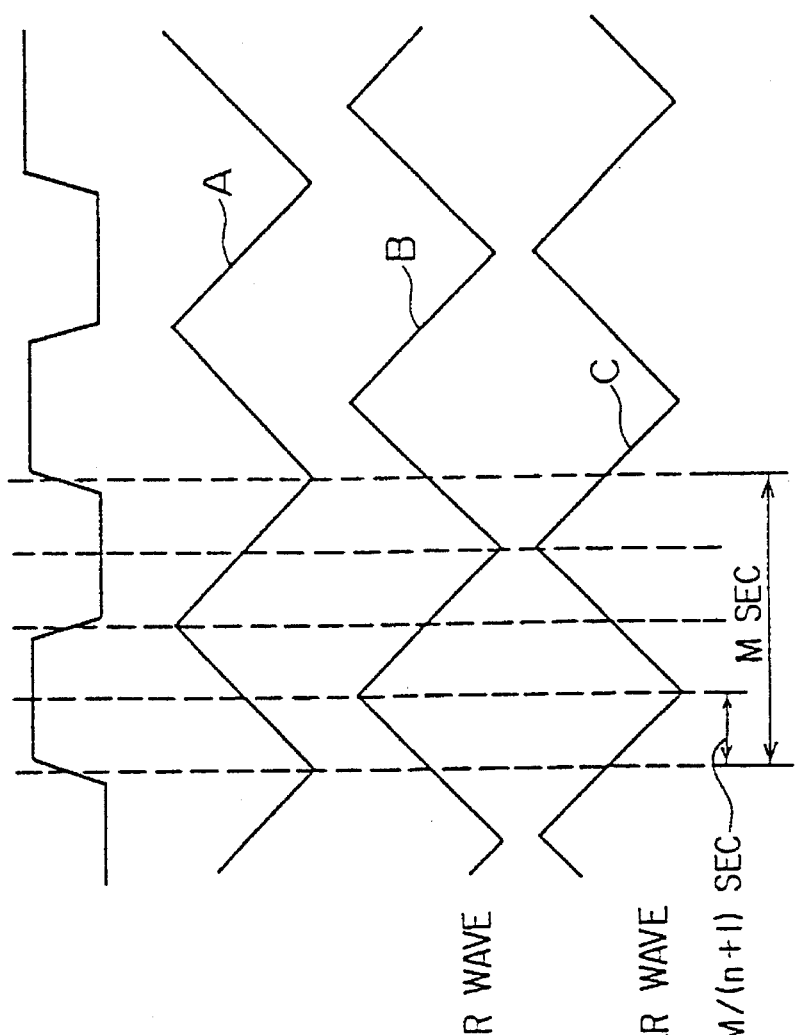
FIGS. 26(a), 26(b) and 26(c) are time charts showing the relation of phases between a reference clock and a triangular wave that is a reference wave in the case of n=3.
Figure 27:
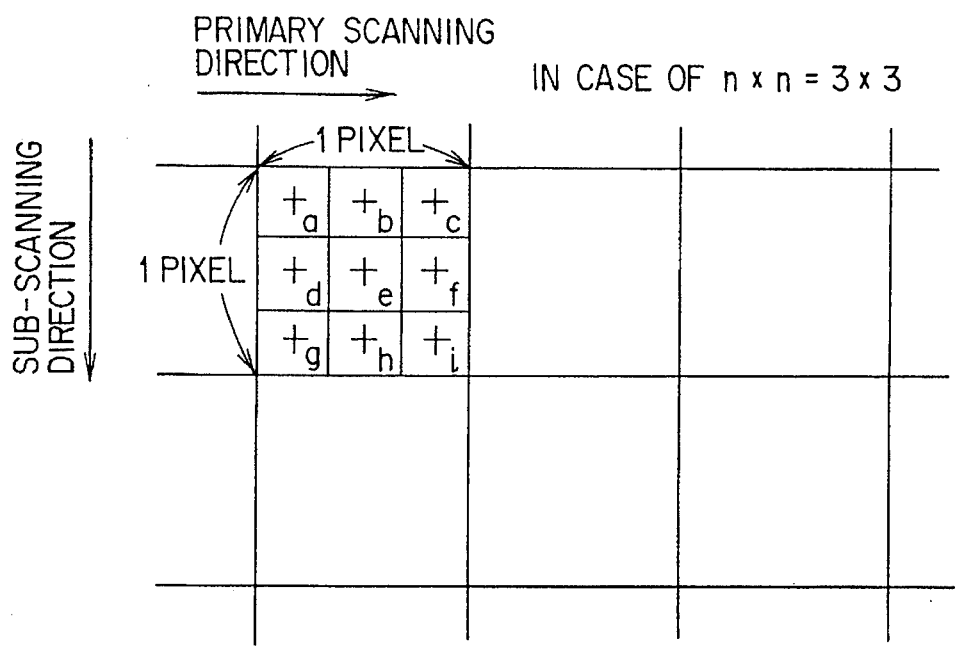
FIG. 27 is a diagram showing pixels in the case of dividing one pixel into a 3×3 matrix in the invention.

FIG. 27 is a diagram showing pixels in the case of dividing a pixel into quantity of 3×3, and FIG. 26 is a time chart showing phases of both a reference clock and triangular waves representing a reference wave.

In the case of n=3, reference triangular wave A, a triangular wave based on clock $DCK_3$ delayed by $(M/4) \times 3$ seconds which is triangular wave B advanced by ¼ cycle and triangular wave C delayed by ¼ cycle based on clock $DCK_1$ delayed by $(M/4) \times 1$ seconds are used.

Figure 28:
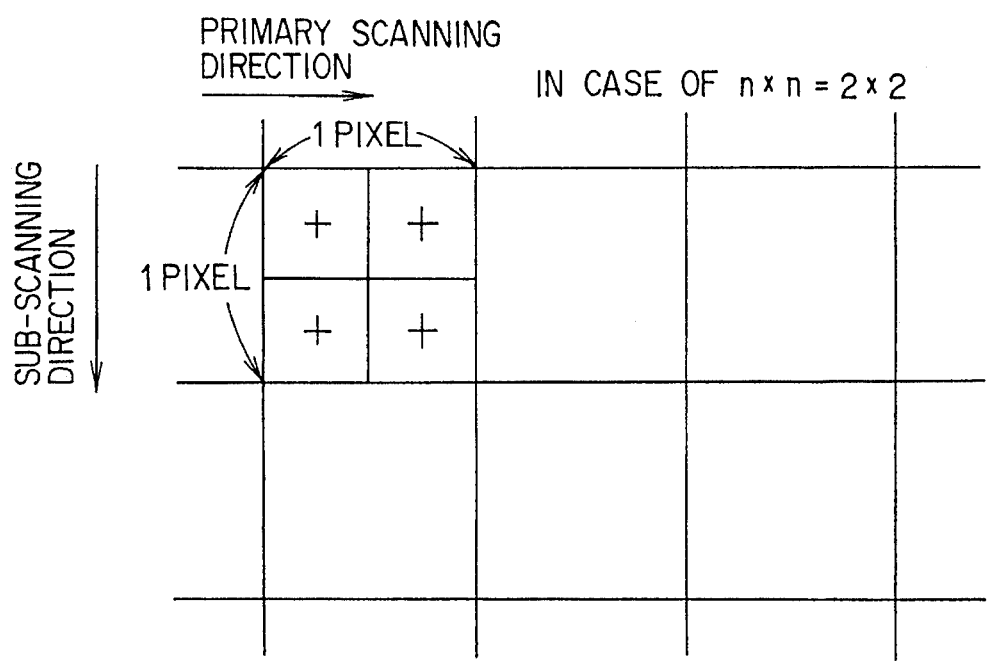
FIG. 28 is a diagram showing pixels in the case of dividing one pixel into the number of 2×2 in the invention.
Figure 29:
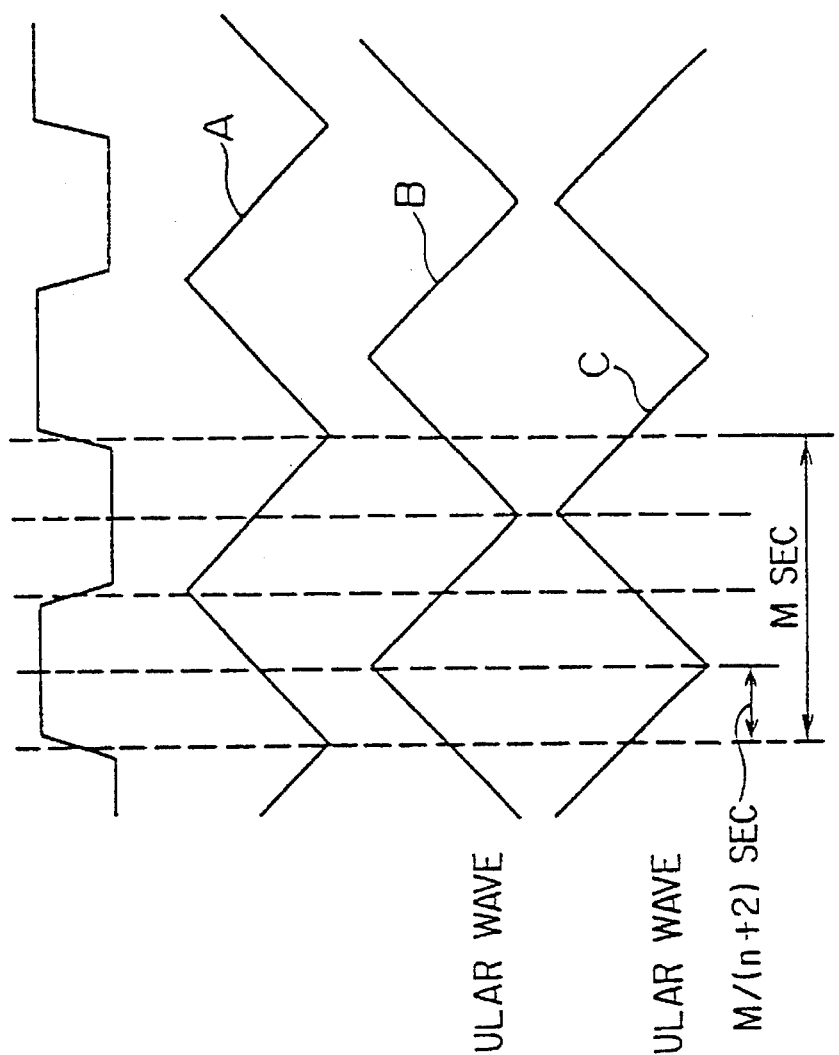
FIGS. 29(a), 29(b), 29(c) and 29(d) are time charts showing the relation of phases between a reference clock and a triangular wave that is a reference wave in the case of n=2.

FIG. 28 is a diagram showing pixels in the case of dividing a pixel into quantity of 2×2, and FIG. 29 is a time chart showing phases of both a reference clock and triangular waves representing a reference wave.

In the case of n=2, a triangular wave based on clock $DCK_3$ delayed by $(M/4) \times 3$ seconds which is triangular wave b advanced by ¼ cycle and triangular wave c delayed by ¼ cycle based on clock $DCK_1$ delayed by $(M/4) \times 1$ seconds are used. When n is even, it is not possible to write with a pixel at the center. Therefore, it is preferable that n takes an odd number.

From the foregoing, reference waves having a phase difference in a unit mentioned above are generated in the triangular wave generating circuit 263 of modulation circuits 260A–260C.

Image discriminating circuit 241 discriminates whether an image belongs to a character area or it belongs to a halftone area, and based on the discrimination, selection signals for selecting the output terminal to output the image density data are sent to select circuit 243, and selection signals for selecting the semiconductor laser from semiconductor laser array 431 are sent to select circuit 245.

The select circuit 243 corresponds to the first select circuit and it outputs image density data from different output terminals D0–D2 according to the selection signals. Concretely, in the case of halftone area, image density data are outputted from all output terminals D0–D2. When discriminated to be a character area or a line image area, image density data are sent from either one of terminal D1 and terminal D2 depending on the direction of an edge thereof and image density data corresponding to image density data on a white background are sent from the other terminal.

The select circuit 45 and delay circuits 291 and 292 correspond to LD drive circuit that drives semiconductor laser array 431. This LD drive circuit causes a laser beam coming from scanning optical system 430 for image formation to deviate to the center or to the sub-scanning direction for image formation, by oscillating one of semiconductor lasers 431a–431c of semiconductor laser array 431 selected based on selection signals with modulated signals from modulation circuits 260A–260C.

Figure 31:
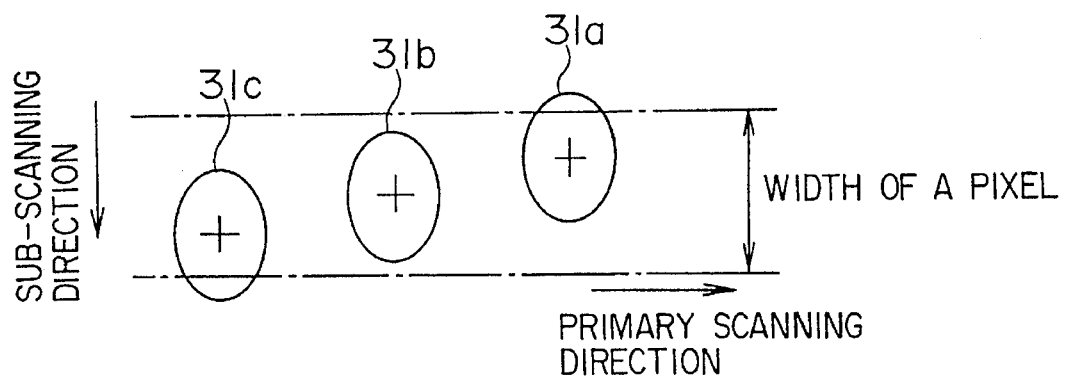
FIG. 31 is a diagram showing a laser spot generated on a photoreceptor by means of semiconductor laser array of the example.

FIG. 31 shows laser spots formed on photoreceptor 401 by semiconductor lasers 431a–431c of the semiconductor laser array 431.

The figure shows how a laser beam is formed to be an image on photoreceptor 401 with delay circuits 291 and 292 which do not function, namely, laser spots 31a–31c caused by laser beams from semiconductor lasers 431a–431c in this order from the right side are shown in the figure. Two solid lines at the top and the bottom which are in parallel with the primary scanning direction show a width of a pixel in the sub-scanning direction, and a distance between the centers of image formation of laser spots 31a and 31c is set to be equal to or less than the width of a pixel. In addition to that, it is possible to correct the deviation of laser spots to true the phases thereof perpendicularly to the scanning direction for recording by causing the aforesaid delay circuits 291 and 292 to function so that timing may be taken with some appropriate delay. When an image is divided into quantity of 2×2, a semiconductor laser array composed of two semiconductor lasers is used.

Operation of image processing circuit 200 in the case where image discriminating circuit 241 discriminates to be a character area will be explained next.

Figure 32:
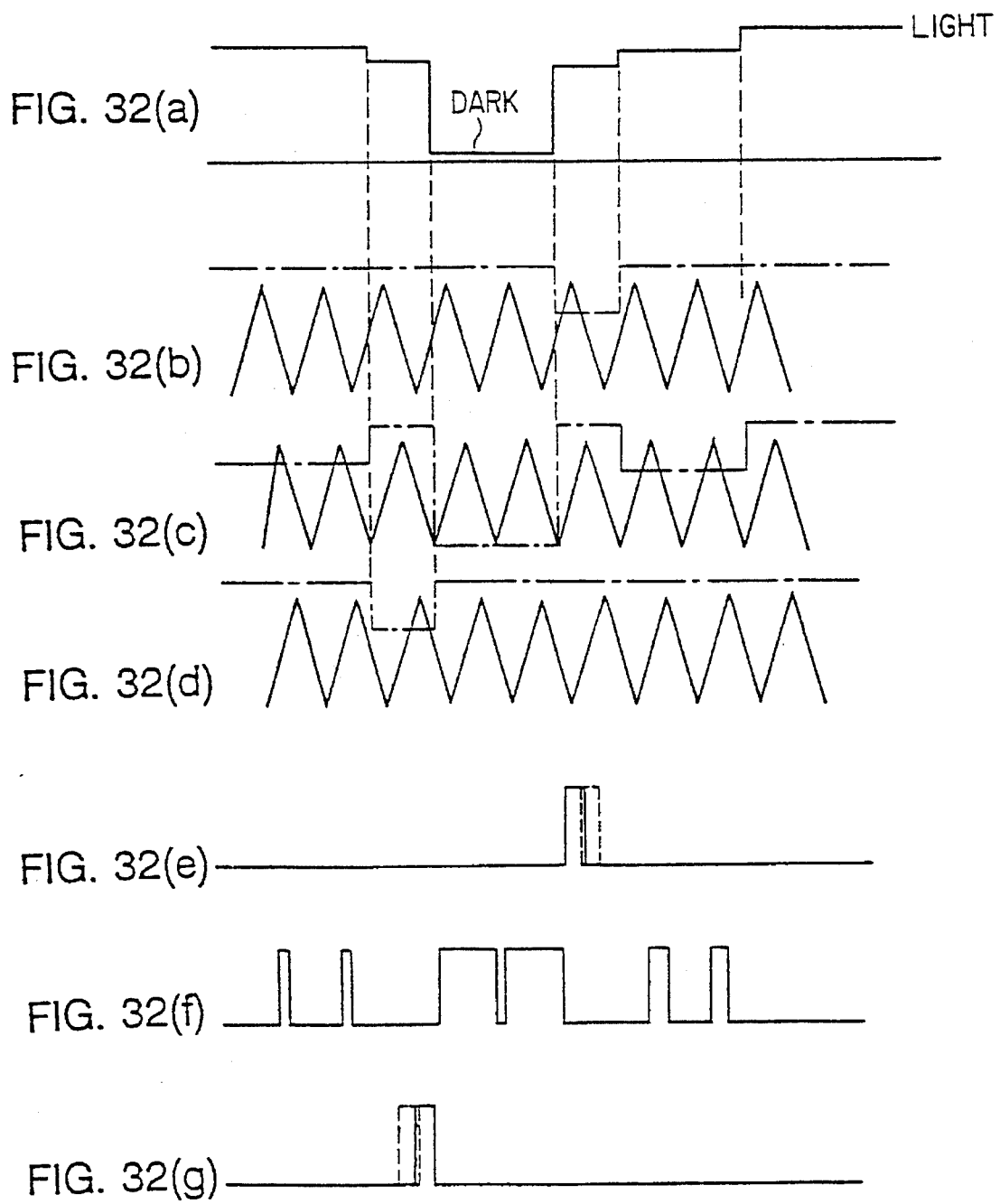
FIG. 32(a), 32(b), 32(c), 32(d), 32(e), 32(f) and 32(g) are time charts showing signals of each portion in an image processing circuit of the example in FIG. 24.

FIGS. 32 (a)–(g) represent time charts showing a signal of each portion of an image processing circuit for modulation of recording positions.

In FIG. 32, (a) represents a part of image density data read from page memory 210 based on reference clock $DCK_0$ with an index signal as a trigger land converted to analog values by means of D/A converting circuit 261. In the time chart, the higher level side shows lighter density (lower density), while the lower level side shows darker density (higher density).

In FIG. 32, (b) shows modulation operation in modulation circuit 260A. In terminal D of the modulation circuit 260A, image density data for a period preceding, by one pixel, the period wherein image discriminating circuit 241 judges to be an edge for changing from high density to low density are inputted, and triangular waves B (shown with solid lines) are generated in triangular wave generating circuit 263 of the modulation circuit 260A. Therefore, comparator 262 compares them and thereby pulse-width-modulated signals shown in (e) are outputted.

In FIG. 32, (c) shows modulation operation in modulation circuit 260B. In triangular wave generating circuit 263 of the modulation circuit 260B, reference triangular wave A is generated, and in terminal D, image density data (shown with dashed lines) for the period wherein image discriminating circuit 241 judges to be a halftone area are inputted. Therefore, they are modulated by reference triangular wave A and modulated signals shown in (f) are outputted.

In FIG. 32, (d) shows modulation operation in modulation circuit 260C in which image density data for a period wherein image discriminating circuit 241 judges to be an edge for changing from high density to low density are inputted, and triangular waves C are generated in triangular wave generating circuit 263. Therefore, comparator 262 compares them and thereby pulse-width-modulated signals shown in (g) are outputted.

The image discriminating circuit 241 further discriminates the deviation of an edge in the sub-scanning direction. When a high density portion is located on the upper side of a scanning line, modulated signals from modulation circuit 260A or 260C are outputted from terminal D0 of select circuit 245 to semiconductor laser 431a, while when the high density portion is judged to be on the lower side of the scanning line, selection signals which output modulated signals from the modulated circuit 260A or 260C from terminal D2 of the select circuit 245 to semiconductor laser 431c through delay circuit 292 are sent to the select circuit 245 through delay circuit 244. The delay circuit 244 is a circuit for delaying signals during the period of modulation processing in modulation circuits 260A–260C.

Figure 33:
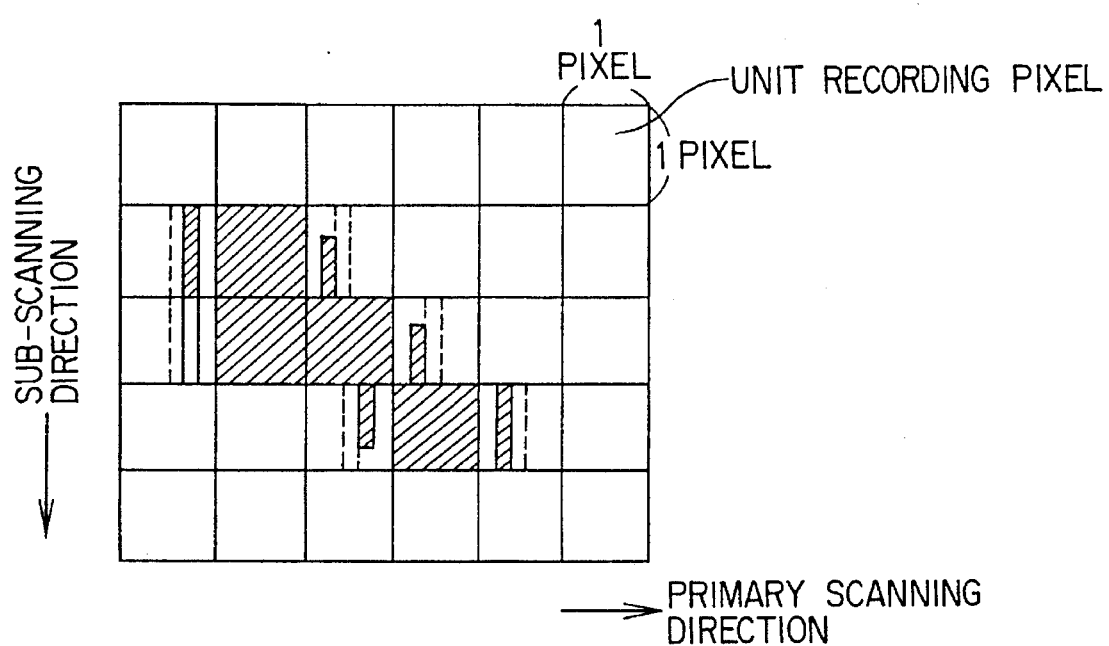
FIG. 33 is a schematic diagram wherein a latent image is formed by means of modulated signals from an image processing circuit of the example.

Owing to image processing circuit 200, as described above, dots in the edge portion may be recorded after they are deviated toward edges in all directions including primary scanning and sub-scanning directions as shown in FIG. 33. Displacement of positions of recording dots is assumed here to be recording position modulation. When a static latent image is formed in the manner,mentioned above, resolving power for the edge portion can be improved. What is shown with dotted lines in FIG. 32 and that in FIG. 33 represent recording made by conventional image forming apparatuses.

When the image discriminating circuit 241 discriminates a halftone area, the following selection signals are sent to select circuit 243 and to select circuit 245. Namely, image density data are outputted from all output terminals D0–D2 of the select circuit 243, and modulation is conducted in each of modulation circuits 260A–260C respectively by the aforesaid triangular wave B, triangular wave A and triangular wave C, thus, select circuit 245 sends modulated signals from modulation circuit 260A to semiconductor laser 431a, modulated signals from modulation circuit 260B to semiconductor laser 431b and modulated signals from modulation circuit 260C to semiconductor laser 431c. Due to the operations in the invention mentioned above, dots which have hitherto been formed conventionally only at the central portion of a pixel can be formed on the entire surface of a pixel, making it possible to reproduce fine and detailed images.

Though the flow of image data mentioned above has been explained on an example of a laser printer wherein data stored tentatively in page memory 210 are outputted, the invention is not limited to this but may be applied to other image forming apparatuses such as a copying machine or the like with a circuit that functions to input image density data from a scanner and to conduct image processing.

Due to a means wherein a phase of a reference wave signal is selected, recording-position-modulated signals wherein density signals of a pixel are modulated by the above-mentioned reference wave are generated, images are further discriminated by an image discriminating circuit, recording position modulation is conducted in the case of a character area, and image recording by means of spread dots is conducted in the halftone area as described above, it has become possible to provide an excellent image forming apparatus which can reproduce halftone images prepared by a scanner, CG or font data finely with improved sharpness.

What is claimed is:

1. A method of forming an image in a form of two-dimensional image lines of pixels, comprising:

processing image signals of neighboring pixels which are around and surround a target pixel to obtain a density distribution around the target pixel, wherein the neighboring pixels comprise pixels on three image lines including:

a current image line having the target pixel therein; an image line preceding the current image line; and an image line succeeding the current image line;

dividing the target pixel into plural sub-pixels to form a matrix that includes n rows×m columns, wherein each sub-pixel is smaller in size than the target pixel;

obtaining a density ratio for each sub-pixel in the target pixel on a basis of the density distribution of the neighboring pixels around the target pixel;

determining a density of one of the sub-pixels by multiplying a density of the target pixel, by a constant P and by the density ratio obtained for the one of the sub-pixels, whereby a sub-density distribution of a plurality of sub-pixels in the target pixel is obtained; and forming a dot image for the target pixel on a basis of the sub-density distribution of the plurality of sub-pixels in the target pixel.

2. The method of claim 1, wherein the constant P has a value which is at least 0.1 and does not exceed 0.9.

3. The method of claim 1, wherein the constant P is determined by an external designation.

4. The method of claim 1, wherein the constant P is determined in accordance with a type of the image to be formed.

5. The method of claim 1, wherein the constant P is determined in accordance with a type of an output apparatus.

6. The method of claim 1, wherein the target pixel comprises a plurality of pixels having u rows×v columns.

7. The method of claim 6, wherein n, m, u, and v satisfy one of the following relations:

$1 \leq u \leq n$; and $2 \leq v \leq m$.

8. An apparatus for forming an electrostatic latent image in a form of a dot for each of a plurality of pixels on a photoreceptor, comprising:

a beam generator for generating a light beam to expose the photoreceptor in a form of dots;

a comparator for comparing an image signal of each of a plurality of pixels with a reference wave signal to generate a plurality of modulating image signals;

a modulator for modulating the light beam on a basis of the modulating image signals to form dot-shaped latent images corresponding to the image signal of said each of said plurality of pixels on the photoreceptor;

a wave generator for generating a plurality of reference wave signals which differ in phase from each other; and said comparator including an image signal processor for processing image signals of a plurality of neighboring pixels which are around and surround a target pixel to obtain a first density distribution around the target pixel, wherein the plurality of neighboring pixels comprise pixels on three image lines including: a current image line having the target pixel therein, an image line preceding the current image line, and an image line succeeding the current image line; the image signal processor including a divider for sub-dividing the target pixel into a plurality of sub-pixels to form a matrix;

means for determining a second density distribution of the plurality of sub-pixels within the target pixel on a basis of the first density distribution;

a selector for selecting a phase of one of the reference wave signals on a basis of the second density distribution; and wherein the image signal processor generates a modulating image signal for the target pixel by comparing an image signal for the target pixel with the one of the reference wave signals having the selected phase.

9. The apparatus of claim 8, wherein:

said each of said plurality of pixels includes an imaging unit area in which a dot is to be formed; and the image signal processor changes a position of the dot in the imaging unit area in accordance with the selected phase of the one of the reference wave signals.

10. The apparatus of claim 8, wherein:

the divider in the image signal processor divides a target pixel into a plurality of sub-pixels to form a sub-matrix having n rows and m columns; and the means for determining the second density distribution is based on data in the plurality of sub-pixels in the n rows and m columns of the sub-matrix.

11. The apparatus of claim 10, further comprising:

a clock pulse generator for generating clock pulses for synchronizing a processing of the image signal of said each of said plurality of pixels, wherein, when:

a clock time of a clock pulse is M seconds; and n is an odd number, then:

the phase of the reference wave signal is delayed by a time in seconds calculated by a relationship $M/(n+1)$; and where n is an even number; then the phase of the reference wave signal is delayed by a time in seconds calculated by another relationship $M/(n+2)$.

* * * * *